US010114371B2

(12) United States Patent
Asakura et al.

(10) Patent No.: US 10,114,371 B2
(45) Date of Patent: Oct. 30, 2018

(54) VEHICLE CONTROL SYSTEM, VEHICLE CONTROL METHOD, AND VEHICLE CONTROL PROGRAM

(71) Applicant: Honda Motor Co., Ltd., Tokyo (JP)

(72) Inventors: Masahiko Asakura, Wako (JP); Hironobu Kiryu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 89 days.

(21) Appl. No.: 15/426,513

(22) Filed: Feb. 7, 2017

(65) Prior Publication Data
US 2017/0235307 A1 Aug. 17, 2017

(30) Foreign Application Priority Data
Feb. 15, 2016 (JP) ................. 2016-025821

(51) Int. Cl.
G05D 1/00 (2006.01)
B60W 40/12 (2012.01)
(Continued)

(52) U.S. Cl.
CPC ........... *G05D 1/0061* (2013.01); *B60W 40/12* (2013.01); *B60W 50/12* (2013.01); *B62D 15/025* (2013.01);
(Continued)

(58) Field of Classification Search
CPC ... G05D 1/0061; G05D 1/0088; B60W 40/12; B60W 50/12; B60W 2530/22
See application file for complete search history.

(56) References Cited

U.S. PATENT DOCUMENTS

2012/0193154 A1* 8/2012 Wellborn ............... B62D 59/04
180/14.2
2013/0024090 A1* 1/2013 Minase ............. B60W 30/1882
701/102
(Continued)

FOREIGN PATENT DOCUMENTS

JP 2010-152732 A 7/2010
JP 2010-202180 A 9/2010
(Continued)

OTHER PUBLICATIONS

Office Action dated Oct. 24, 2017, issued in counterpart Japanese application No. 2016-025821, with English translation. (8 pages).

*Primary Examiner* — Calvin Cheung
(74) *Attorney, Agent, or Firm* — Westerman, Hattori, Daniels & Adrian, LLP

(57) ABSTRACT

A vehicle control device includes a detecting unit that detects a towing state of a subject vehicle, a recognizing unit that recognizes surrounding situations of the subject vehicle, a control unit that performs automatic control in which at least one of acceleration-and-deceleration and steering of the subject vehicle is automatically controlled on the basis of the surrounding situations of the subject vehicle recognized by the recognizing unit, and a changing unit that changes, if the detecting unit has detected that the subject vehicle is in a state of towing an object, details of control performed by the control unit in such a manner that it is less likely to perform the automatic control than in the case where the detecting unit has not detected that the subject vehicle is in a state of towing an object.

13 Claims, 14 Drawing Sheets

(51) Int. Cl.
  *B60W 50/12* (2012.01)
  *B62D 15/02* (2006.01)
(52) U.S. Cl.
  CPC ..... *B62D 15/0255* (2013.01); *B62D 15/0265* (2013.01); *G05D 1/0088* (2013.01); *B60W 2530/22* (2013.01)

(56) References Cited

U.S. PATENT DOCUMENTS

| | | | |
|---|---|---|---|
| 2013/0338868 A1* | 12/2013 | Essame | B60W 30/18163 |
| | | | 701/23 |
| 2014/0336893 A1* | 11/2014 | Ideshio | B60K 6/445 |
| | | | 701/70 |
| 2016/0101811 A1* | 4/2016 | Kyrtsos | B62D 13/06 |
| | | | 701/25 |
| 2017/0068247 A1* | 3/2017 | Hara | B60D 1/24 |
| 2017/0096139 A1* | 4/2017 | Christensen | B60W 30/0956 |
| 2017/0168503 A1* | 6/2017 | Amla | G05D 1/0011 |
| 2018/0134300 A1* | 5/2018 | Anschuber | B60K 6/485 |

FOREIGN PATENT DOCUMENTS

| | | |
|---|---|---|
| JP | 2015-158469 A | 9/2015 |
| JP | 2016-17914 A | 2/2016 |
| JP | 2017-047807 A | 3/2017 |

\* cited by examiner

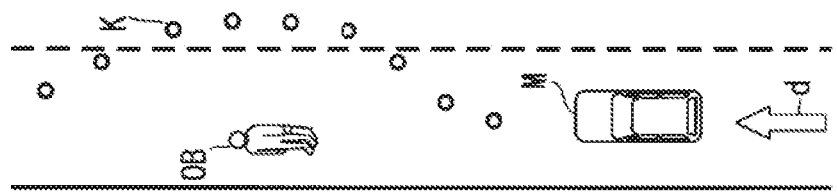
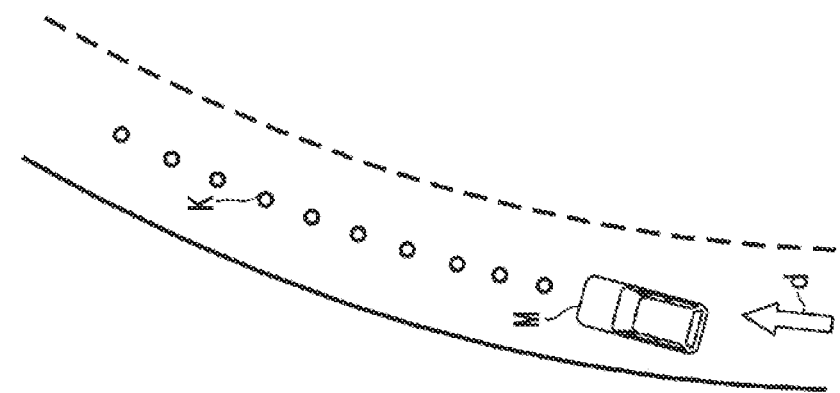
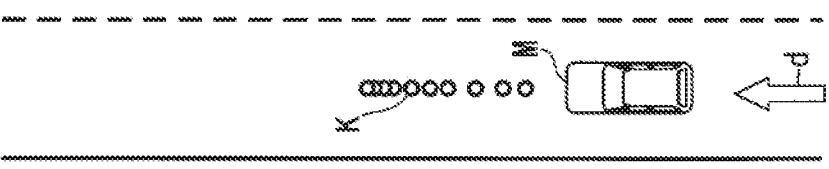
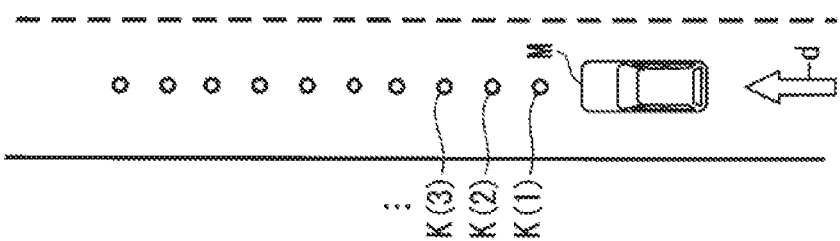

_US 10,114,371 B2_

VEHICLE CONTROL SYSTEM, VEHICLE CONTROL METHOD, AND VEHICLE CONTROL PROGRAM

CROSS REFERENCES TO RELATED APPLICATIONS

The present application claims priority under 35 U.S.C. § 119 to Japanese Patent Application No. 2016-025821, filed Feb. 15, 2016, entitled "Vehicle Control System, Vehicle Control Method, and Vehicle Control Program." The contents of this application are incorporated herein by reference in their entirety.

TECHNICAL FIELD

The present disclosure relates to a vehicle control system, a vehicle control method, and a vehicle control program.

BACKGROUND

In recent years, research has been conducted on techniques of automatically controlling one or both of the acceleration-and-deceleration and steering of a subject vehicle. On the other hand, there is known a towed-object connection detector (for example, see Japanese Unexamined Patent Application Publication No. 2010-152732) including a towed-object connecting unit, a traveling-state detecting unit, an object detecting unit, and a determining unit. The towed-object connecting unit is provided so that an object to be towed can be connected behind the vehicle. The traveling-state detecting unit detects a traveling state on the basis of the velocity of the vehicle. The object detecting unit is provided on the back of the vehicle and detects the presence of an object within a predetermined distance from the external surface of the vehicle. The determining unit determines that the object to be towed is connected to the towed-object connecting unit if the object detecting unit detects the presence of the object for a predetermined period or longer in the state where the traveling-state detecting unit detects forward movement of the vehicle at a predetermined velocity or higher.

However, in the related art, there is no technique to implement automatic driving in accordance with a towing state.

SUMMARY

The present application describes, for example, a vehicle control system, a vehicle control method, and a vehicle control program that enable automatic driving to be appropriately implemented in accordance with the towing state of a subject vehicle.

According to a first aspect of the present disclosure, a vehicle control system includes a detecting unit that detects a towing state of a subject vehicle, a recognizing unit that recognizes surrounding situations of the subject vehicle, a control unit that performs automatic control in which at least one of acceleration-and-deceleration and steering of the subject vehicle is automatically controlled on the basis of the surrounding situations of the subject vehicle recognized by the recognizing unit, and a changing unit that changes, if the detecting unit has detected that the subject vehicle is in a state of towing an object, details of control performed by the control unit in such a manner that it is less likely to perform the automatic control than in the case where the detecting unit has not detected that the subject vehicle is in a state of towing an object.

According to a second aspect of the present disclosure, in the vehicle control system according to the first aspect, if the detecting unit has detected that the subject vehicle is in a state of towing an object, the changing unit may prohibit the automatic control performed by the control unit on the basis of at least a situation behind the subject vehicle in a traveling direction of the subject vehicle among the surrounding situations of the subject vehicle recognized by the recognizing unit.

According to a third aspect of the present disclosure, in the vehicle control system according to the second aspect, if the detecting unit has detected that the subject vehicle is in a state of towing an object, the changing unit may prohibit, in the automatic control performed by the control unit, one or all of control for making the subject vehicle change lanes from a subject lane in which the subject vehicle is traveling to a lane next to the subject lane, control for making the subject vehicle change lanes to a lane that merges with the subject lane, and control for making the subject vehicle change lanes to a lane that branches from the subject lane.

According to a fourth aspect of the present disclosure, in the vehicle control system according to the second or third aspect, the vehicle control system may further includes an input unit that receives an input operation performed by a vehicle occupant and an output unit that outputs information to the vehicle occupant. The changing unit may cause the output unit to output information indicating a section obtained by excluding a section in which the automatic control is prohibited from a traveling section determined on the basis of the input operation received by the input unit, and may select a section in which the control unit is caused to perform the automatic control on the basis of an input operation performed by the vehicle occupant on the input unit. The control unit may perform the automatic control in the section selected by the changing unit.

According to a fifth aspect of the present disclosure, in the vehicle control system according to the fourth aspect, if the detecting unit has detected that the subject vehicle is in a state of towing an object after the input operation for determining the traveling section of the subject vehicle has been performed on the input unit and before the control unit performs the automatic control, the changing unit may delete setting of the traveling section and may prohibit the automatic control performed by the control unit.

According to a sixth aspect of the present disclosure, in the vehicle control system according to the fourth or fifth aspect, if the detecting unit has detected that the subject vehicle is in a state of towing an object, the changing unit may cause the output unit to output information indicating that the automatic control performed by the control unit is prohibited.

According to a seventh aspect of the present disclosure, in the vehicle control system according to any one of the first to sixth aspects, if the detecting unit has detected that the subject vehicle is in a state of towing an object, the changing unit may set a maximum velocity of the subject vehicle to be output in the automatic control performed by the control unit to a value lower than a maximum velocity of the subject vehicle to be output in the automatic control performed by the control unit if the detecting unit has not detected that the subject vehicle is a towing vehicle.

According to an eighth aspect of the present disclosure, in the vehicle control system according to any one of the first to seventh aspects, if the detecting unit has detected that the subject vehicle is in a state of towing an object, the changing unit may set a distance to be maintained between the subject vehicle and a surrounding vehicle of the subject vehicle in the automatic control performed by the control unit to a value larger than a distance to be maintained between the subject vehicle and the surrounding vehicle of the subject vehicle in the automatic control performed by the control unit if the detecting unit has not detected that the subject vehicle is a towing vehicle.

According to a ninth aspect of the present disclosure, a vehicle control method performed by an in-vehicle computer includes detecting a towing state of a subject vehicle in which the in-vehicle computer is installed, recognizing surrounding situations of the subject vehicle, performing automatic control for automatically controlling at least one of acceleration-and-deceleration and steering of the subject vehicle on the basis of the recognized surrounding situations of the subject vehicle, and if it has been detected that the subject vehicle is in a state of towing an object, changing details of control in the automatic control in such a manner that it is less likely to perform the automatic control than in the case where it has not been detected that the subject vehicle is in a state of towing an object.

According to a tenth aspect of the present, disclosure, a vehicle control program causes an in-vehicle computer to detect a towing state of a subject vehicle in which the in-vehicle computer is installed, recognize surrounding situations of the subject vehicle, perform automatic control for automatically controlling at least one of acceleration-and-deceleration and steering of the subject vehicle on the basis of the recognized surrounding situations of the subject vehicle, and if it has been detected that the subject vehicle is in a state of towing an object, change details of control in the automatic control in such a manner that it is less likely to perform the automatic control than in the case where it has not been detected that the subject vehicle is in a state of towing an object.

In the first, ninth, and tenth aspects, for example, if it has been detected that the subject vehicle is in a state of towing an object, details of control performed by the control unit are changed in such a manner that it is less likely to perform the automatic control than in the case where it has not been detected that the subject vehicle is in a state of towing an object. Accordingly, it is possible to appropriately implement automatic driving in accordance with the towing state of the subject vehicle. Here, automatic driving is also referred to as automated drive.

In the second aspect, if it has been detected that the subject vehicle is in a state of towing an object, the automatic control performed by the control unit on the basis of at least a situation behind the subject vehicle in a traveling direction of the subject vehicle among the surrounding situations of the subject vehicle is prohibited. Accordingly, it is possible to appropriately implement automatic driving in accordance with the towing state of the subject vehicle and also to more safely implement automatic driving.

In the third aspect, if it has been detected that the subject vehicle is in a state of towing an object, in the automatic control performed by the control unit, one or all of control for making the subject vehicle change lanes from a subject lane in which the subject vehicle is traveling to a lane next to the subject lane, control for making the subject vehicle change lanes to a lane that merges with the subject lane, and control for making the subject vehicle change lanes to a lane that branches from the subject lane are prohibited. Accordingly, it is possible to appropriately implement automatic driving in accordance with the towing state of the subject vehicle and also to more safely implement automatic driving.

In the fourth aspect, the output unit is caused to output information indicating a section obtained by excluding a section in which the automatic control is prohibited from a traveling section determined on the basis of the input operation received by the input unit, a section in which the control unit is caused to perform the automatic control is selected on the basis of the input operation performed by the user on the input unit, and the control unit performs the automatic control in the section selected by the changing unit. Accordingly, it is possible to implement automatic driving in accordance with a plan of the vehicle occupant.

In the fifth aspect, if it has been detected that the subject vehicle is in a state of towing an object after the input operation for determining the traveling section of the subject vehicle has been performed on the input unit and before the control unit performs the automatic control, setting of the traveling section is deleted and the automatic control performed by the control unit is prohibited. Accordingly, it is possible to appropriately implement automatic driving in accordance with the towing state of the subject vehicle and also to more safely implement automatic driving.

In the sixth aspect, if it has been detected that the subject vehicle is in a state of towing an object, the output unit is caused to output information indicating that the automatic control performed by the control unit is prohibited. Accordingly, it is possible to smoothly switch the driving to manual driving implemented by a driver.

In the seventh aspect, if it has been detected that the subject vehicle is in a state of towing an object, the maximum velocity of the subject vehicle to be output in the automatic control performed by the control unit is set to a value lower than the maximum velocity of the subject vehicle to be output in the automatic control performed by the control unit if it has not been detected that the subject vehicle is a towing vehicle. Accordingly, it is possible to more safely implement automatic driving.

In the eighth aspect, if it has been detected that the subject vehicle is in a state of towing an object, the distance to be maintained between the subject vehicle and the surrounding vehicle of the subject vehicle in the automatic control performed by the control unit is set to a value larger than the distance to be maintained between the subject vehicle and the surrounding vehicle of the subject vehicle in the automatic control performed by the control unit if it has not been detected that the subject vehicle is a towing vehicle. Accordingly, it is possible to more safely implement automatic driving.

BRIEF DESCRIPTION OF THE DRAWINGS

The advantages of the disclosure will become apparent in the following description taken in conjunction with the following drawings.

FIGS. 5A to 5D illustrate examples of tracks generated by a lane-keeping control unit.

DETAILED DESCRIPTION

Hereinafter, a vehicle control system, a vehicle control method, and a vehicle control program each according to an embodiment of the present disclosure will be described with reference to the drawings.

Vehicle Configuration

Figure 1:
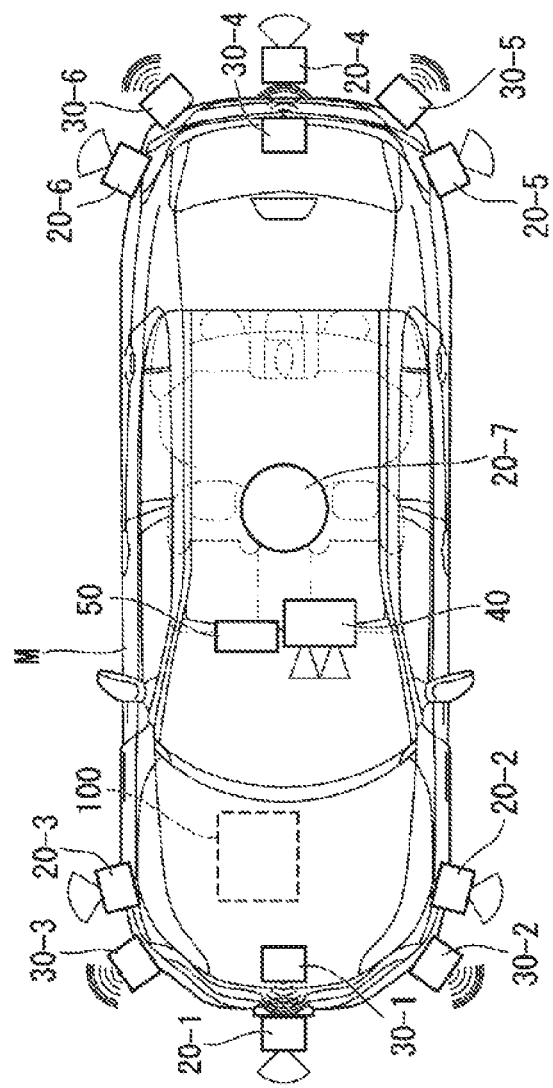
FIG. 1 illustrates components of a vehicle in which a vehicle control device of a vehicle control system according to an embodiment is installed.

FIG. 1 illustrates components of a vehicle (hereinafter referred to as subject vehicle M) in which a vehicle control device 100 of a vehicle control system 1 according to an embodiment is installed. The vehicle control system 1 according to the embodiment includes, for example, various sensors and the vehicle control device 100. Examples of the vehicle in which the vehicle control device 100 is installed include automobiles including an internal combustion engine, such as a diesel engine or a gasoline engine, as a power source, an electric car including an electric motor as a power source, and a hybrid car including both an internal combustion engine and an electric motor, the automobiles or cars each having two wheels, three wheels, four wheels, or the like. The above-described electric car is driven by using, for example, electric power discharged from a battery such as a secondary battery, a hydrogen fuel cell, a metal fuel cell, or an alcohol fuel cell.

As illustrated in FIG. 1, in the subject vehicle M, sensors such as finders 20-1 to 20-7, radars 30-1 to 30-6, and a camera unit 40, a navigation device 50, and the above-described vehicle control device 100 are installed. Each of the finders 20-1 to 20-7 uses, for example, light detection and ranging (or laser imaging detection and ranging, LIDAR) for measuring scattered light with respect to light for irradiation and measuring the distance to an object. For example, the finder 20-1 is attached to a front grille or the like, and the finders 20-2 and 20-3 are attached to side surfaces of the body of the vehicle, to door mirrors, inside head lamps, near side lamps, or the like. The finder 20-4 is attached to a trunk lid or the like, and the finders 20-5 and 20-6 are attached to side surfaces of the body of the vehicle, inside tail lamps, or the like. The above-described finders 20-1 to 20-6 each have, for example, a detection region of about 150° in the horizontal direction. In addition, the finder 20-7 is attached to a roof or the like. The finder 20-7 has, for example, a detection region of about 360° in the horizontal direction.

The above-described radars 30-1 and 30-4 are each, for example, a long-range millimeter-wave radar having a larger detection region in the depth direction than the other radars. In addition, the radars 30-2, 30-3, 30-5, and 30-6 are each a middle-range millimeter-wave radar having a smaller detection region in the depth direction than the radars 30-1 and 30-4. Hereinafter, the finders 20-1 to 20-7 are simply referred to as "finders 20" unless the finders 20-1 to 20-7 are specifically distinguished from one another, and the radars 30-1 to 30-6 are simply referred to as "radars 30" unless the radars 30-1 to 30-6 are specifically distinguished from one another. Each of the radars 30 detects an object by using, for example, a frequency modulated continuous wave (FM-CW).

The camera unit 40 includes, for example, a digital camera including a solid-state image sensor such as a charge coupled device (CCD) image sensor or a complementary metal oxide semiconductor (CMOS) image sensor. The camera unit 40 is attached to an upper portion of a front wind shield, the rear surface of a rearview mirror, or the like. The camera unit 40, for example, repeatedly and periodically captures an image of the region in front of the subject vehicle M.

Note that the configuration illustrated in FIG. 1 is illustrative, and accordingly, part of the configuration may be omitted or another part may be added to the configuration.

Figure 2:
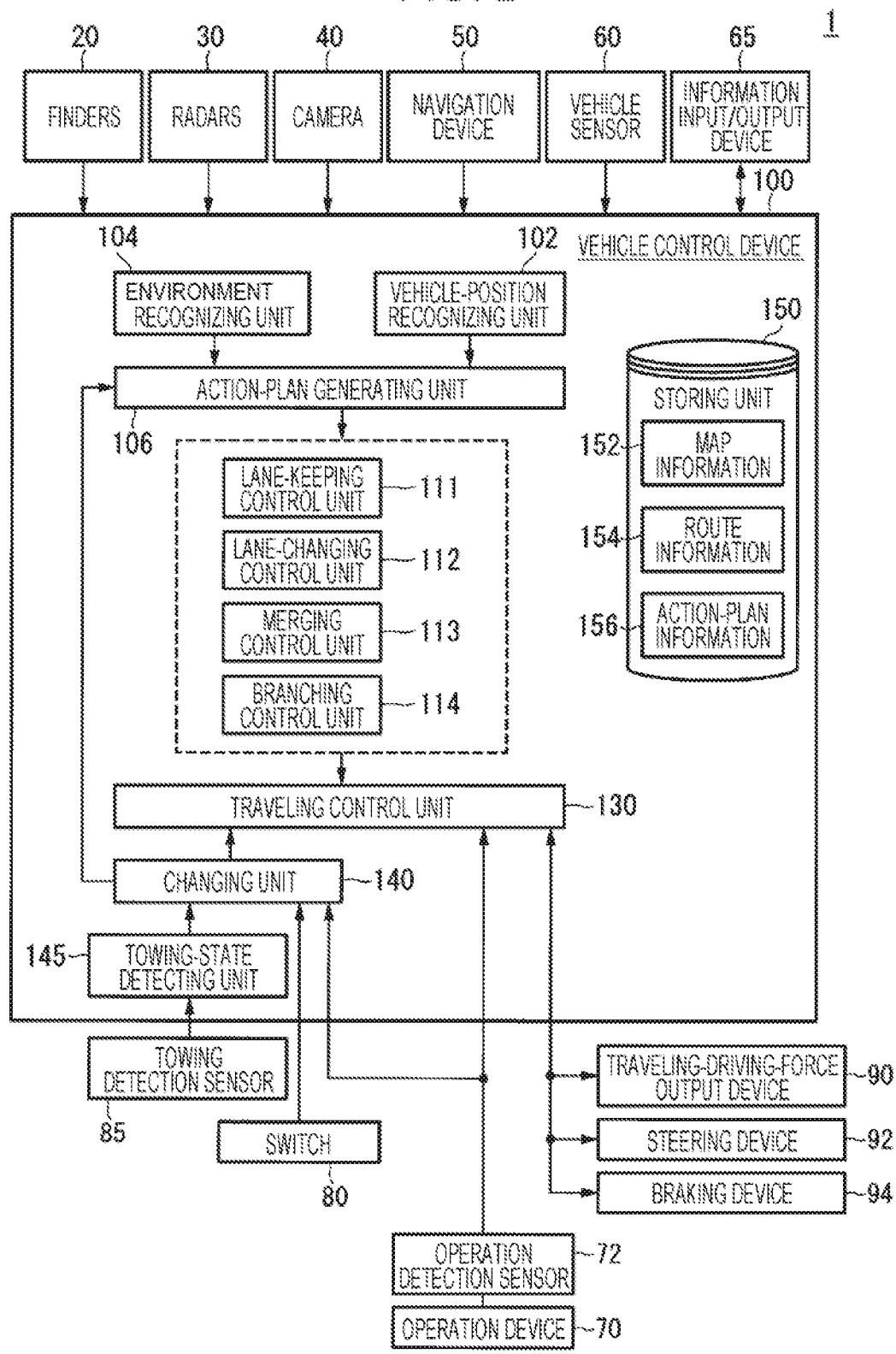
FIG. 2 illustrates a functional configuration of the vehicle control device of the vehicle control system according to the embodiment as well as other components of a subject vehicle.

FIG. 2 illustrates a functional configuration of the vehicle control device 100 of the vehicle control system 1 according to the embodiment as well as other components of the subject vehicle M. In addition to the finders 20, the radars 30, and the camera unit 40, the navigation device 50, a vehicle sensor 60, an information input/output device 65, an operation device 70, an operation detection sensor 72, a switch 80, a towing detection sensor 85, a traveling-driving-force output device 90, a steering device 92, a braking device 94, and the vehicle control device 100 are installed in the subject vehicle M. These devices and equipment are connected to one another via a multiplex communication line such as a controller area network (CAN) communication line, a serial communication line, a wireless communication network line, or the like.

The navigation device 50 includes a global navigation satellite system (GNSS) receiver, map information (navigation map), a touch-panel display serving as a user interface, a speaker, and a microphone. The navigation device 50 specifies the position of the subject vehicle M by using the GNSS receiver and calculates a route from the position to a destination specified by a user. Information on the route calculated by the navigation device 50 is stored in a storing unit 150 as route information 154. The position of the subject vehicle M may be specified or corrected by using an inertial navigation system (INS) using the output from the vehicle sensor 60. In addition, while the vehicle control device 100 is in manual-driving mode, the navigation device 50 offers guidance on the route to the destination by using voice or displaying navigation information. Note that the configuration for specifying the position of the subject vehicle M may be provided independently of the navigation device 50. In addition, the navigation device 50 may be realized by, for example, a function of a terminal apparatus such as a smartphone or a tablet terminal that the user owns. In this case, information is transmitted and received between the terminal apparatus and the vehicle control device 100 by wireless or wired communication.

The vehicle sensor 60 includes a velocity sensor that detects velocity, an acceleration sensor that detects acceleration, a yaw rate sensor that detects an angular velocity around the vertical axis, and a direction sensor that detects the orientation of the subject vehicle M.

The information input/output device 65 includes, for example, a speaker, a display, and a touch panel. On the basis of information output from the vehicle control device 100, the information input/output device 65 outputs voice or displays an image. In addition, the information input/output device 65 receives an operation performed by a vehicle occupant. For example, upon reception of an input operation of inputting the information indicating that the subject vehicle M is a towing vehicle that tows an object to be towed, the information input/output device 65 causes the storing unit 150 to store the information indicating that the subject vehicle M is a towing vehicle. Note that the input operation of inputting the information indicating that the subject vehicle M is a towing vehicle may be performed along with the setting of the destination or the like in the navigation device 50. In addition, the input operation of inputting the information indicating that the subject vehicle M is a towing vehicle may be performed on the navigation device 50. Hereinafter, storing the information indicating that the subject vehicle M is a towing vehicle in the storing unit 150 may be referred to as "registration".

If the subject vehicle M is, for example, an automobile including an internal combustion engine as a power source, the traveling-driving-force output device 90 includes an engine and an engine electronic control unit (ECU) that controls the engine; if the subject vehicle M is an electric car including an electric motor as a power source, the traveling-driving-force output device 90 includes a motor for traveling and a motor ECU that controls the motor for traveling; if the subject vehicle M is a hybrid car, the traveling-driving-force output device 90 includes an engine, an engine ECU, a motor for traveling, and a motor ECU. If the traveling-driving-force output, device 90 includes the engine and no motor for traveling, the engine ECU adjusts a throttle opening degree of the engine, a shift stage, and the like in accordance with the information input from a traveling control unit 130, which will be described later, in order to output a traveling driving force (torque) used for traveling of the vehicle. If the traveling-driving-force output device 90 includes the motor for traveling and no engine, the motor ECU adjusts a duty ratio of a pulse width modulation (PWM) signal to be given to the motor for traveling in accordance with the information input from the traveling control unit 130 in order to output the above-described traveling driving force. If the traveling-driving-force output device 90 includes the engine and the motor for traveling, both the engine ECU and the motor ECU control the traveling driving force in cooperation with each other in accordance with the information input from the traveling control unit 130.

The steering device 92 includes, for example, an electric motor, a steering torque sensor, and a steering angle sensor. The electric motor, for example, changes the orientation of a steered wheel by causing a force to act on a rack-and-pinion mechanism or the like. The steering torque sensor detects, as a steering torque (steering force), for example, the torsion of a torsion bar when a steering wheel is operated. The steering angle sensor detects the steering angle (or actual steering angle), for example. The steering device 92 drives the electric motor in accordance with information input from the traveling control unit 130 so as to change the orientation of the steered wheel.

The braking device 94 is, for example, an electric servo braking device including a brake caliper, a cylinder that transmits an oil pressure to the brake caliper, an electric motor that generates the oil pressure for the cylinder, and a braking control unit. The braking control unit of the electric servo braking device controls the electric motor in accordance with information input from the traveling control unit 130 so as to output a braking torque to each wheel in accordance with a braking operation. The electric servo braking device may include, as a backup, a mechanism that transmits the oil pressure generated by the operation of a brake pedal to the cylinder via a master cylinder. Note that the braking device 94 is not limited to the above-described electric servo braking device and may be an electronically controlled oil-pressure braking device. The electronically controlled oil-pressure braking device controls an actuator in accordance with information input from the traveling control unit 130 so as to transmit the oil pressure of the master cylinder to the cylinder. In addition, the braking device 94 may include a regenerative brake. The regenerative brake uses electric power generated by the motor for traveling that may be included in the traveling-driving-force output device 90.

The operation device 70 includes, for example, an accelerator pedal, a steering wheel, a brake pedal, and a shift lever. The operation detection sensor 72 that detects the presence and absence and the amount of an operation performed by a driver is attached to the operation device 70. The operation detection sensor 72 includes, for example, an accelerator position sensor, a steering torque sensor, a brake sensor, and a shift position sensor. The operation detection sensor 72 outputs the accelerator position, the steering torque, the brake depression amount, the shift position, and the like, which have been obtained as detection results, to the traveling control unit 130. Instead, the detection results of the operation detection sensor 72 may be directly output to the traveling-driving-force output device 90, the steering device 92, or the braking device 94.

The switch 80 is a switch operated by a vehicle occupant. The switch 80 may be, for example, a mechanical switch provided for a steering wheel, a garnish (e.g., dashboard), or the like, or a graphical user interface (GUI) switch provided on a touch panel of the navigation device 50. Upon reception of an operation performed by a vehicle occupant, the switch 80 generates a control-mode specification signal that specifies the control mode of the traveling control unit 130 as automatic-driving mode (also referred to as automated drive mode) or manual-driving mode and outputs the generated control-mode specification signal to a changing unit 140. The automatic-driving mode refers to a driving mode in which the vehicle travels without a driver's operations (or with smaller amount of operations or less frequent operations than in manual-driving mode) and is, more specifically, a driving mode in which one or ail of the traveling-driving-force output device 90, the steering device 92, and the braking device 94 are controlled on the basis of an action plan, which will be described later. Assisted drive mode may be included herein.

The towing detection sensor 85 includes, for example, a sound wave sensor, an infrared sensor, and a camera. For example, the towing detection sensor 85 is attached near a trunk lid or a rear window in order to detect an object DO behind the subject vehicle M. Note that the towing detection sensor 85 may also be attached in such a manner as to detect, from the inside of the vehicle through the rear window, the object DO behind the subject vehicle M.

In addition, the towing detection sensor 85 may be attached to a connecting member that is provided in order to tow the object to be towed, and may detect the object behind the subject vehicle M in response to the object to be towed being connected to the connecting member. An example of the connecting member is a trailer hitch including members such as a towing bracket and a coupling ball.

If the connecting member stored inside the vehicle is driven to protrude outside the vehicle by a driving mechanism, which is not illustrated, the towing detection sensor 85 may detect the object DO behind the subject vehicle M in accordance with the driving amount (e.g., rotation speed of motor) of the driving mechanism, the degree of protrusion of the connecting member outside the vehicle, or the like.

Vehicle Control Device

Now, the vehicle control device 100 will be described. The vehicle control device 100 includes, for example, a vehicle-position recognizing unit 102, an environment recognizing unit 104, an action-plan generating unit 106, a lane-keeping control unit 111, a lane-changing control unit 112, a merging control unit 113, a branching control unit 114, the traveling control unit 130, the changing unit 140, a towing-state detecting unit 145, and the storing unit 150. The environment recognizing unit 104 is an example of a "recognizing unit"; the combination of the action-plan generating unit 106, the lane-keeping control unit 111, the lane-changing control unit 112, the merging control unit 113, the branching control unit 114, and the traveling control unit 130 is an example of a "control unit"; and the towing-state detecting unit 145 is an example of a "detecting unit".

One or all of the vehicle-position recognizing unit 102, the environment recognizing unit 104, the action-plan generating unit 106, the lane-keeping control unit 111, the lane-changing control unit 112, the merging control unit 113, the branching control unit 114, the traveling control unit 130, the changing unit 140, and the towing-state detecting unit 145 may be realized by a processor such as a central processing unit (CPU) executing a program. Alternatively, one or all of the above-described units may be realized by hardware such as large scale integration (LSI) or an application specific integrated circuit (ASIC).

The storing unit 150 may be realized by a nonvolatile storage medium such as a read-only memory (ROM), a flash memory, a hard disk drive (HDD) or a volatile storage medium such as a random access memory (RAM) or a register. The program executed by the processor may be stored in advance in the nonvolatile storage medium of the storing unit 150 or may be downloaded from an external apparatus via in-vehicle Internet equipment or the like. Alternatively, the program may be installed in the storing unit 150 by a portable storage medium being attached to a drive device, which is not illustrated, the portable storage medium storing the program.

On the basis of map information 152 stored in the storing unit 150 and information input from the finders 20, the radars 30, the camera unit 40, the navigation device 50, or the vehicle sensor 60, the vehicle-position recognizing unit 102 recognizes the lane (traveling lane) in which the subject vehicle M is traveling and the relative position of the subject vehicle M relative to the traveling lane. The map information 152 is, for example, more accurate map information than the navigation map included in the navigation device 50 and includes information on the center of the lane or information on the boundary of the lane, for example. More specifically, the map information 152 includes road information, traffic restriction information, address information (zip code and address), facility information, and telephone number information. The road information includes information indicating the type of the road, such as an expressway, a toll road, a national road, or a prefectural road, and information on the number of lanes of the road, the width of each lane, the gradient of the road, the position (three-dimensional coordinates including longitude, latitude, and height) of the road, the curvature of a curve of the lane, the positions of merging and branching points of the lane, and a sign provided for the road. The traffic restriction information includes information indicating that a lane is blocked owing to construction, a traffic accident, a traffic jam, or the like.

Figure 3:
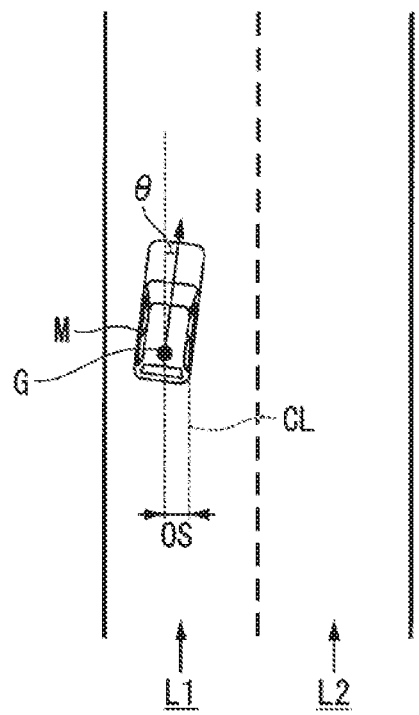
FIG. 3 illustrates how a vehicle-position recognizing unit recognizes a relative position of the subject vehicle relative to a traveling lane.

FIG. 3 illustrates how the vehicle-position recognizing unit 102 recognizes the relative position of the subject vehicle M relative to a traveling lane L1. The vehicle-position recognizing unit 102 recognizes, as the relative position of the subject vehicle M relative to the traveling lane L1, for example, a deviation OS of a reference point (e.g., center of gravity) G of the subject vehicle M from a traveling-lane center CL and an angle θ formed by a line in the traveling direction of the subject vehicle M and a line parallel to the traveling-lane center CL. Instead, the vehicle-position recognizing unit 102 may recognize, as the relative position of the subject vehicle M relative to the traveling lane L1, for example, the position of the reference point G of the subject vehicle M with respect to a side edge of the traveling lane L1.

On the basis of information input, from the finders 20, the radars 30, the camera unit 40, and the like, the environment recognizing unit 104 recognizes the positions of surrounding vehicles and states of the surrounding vehicles such as the velocity and acceleration. A surrounding vehicle in the embodiment refers to a vehicle traveling near the subject vehicle M in the same direction as the subject vehicle M. The position of a surrounding vehicle may be represented by a representative point of the vehicle, such as the center of gravity or a corner of the vehicle, or may be represented by a region defined by the contour of the vehicle. The states of a surrounding vehicle may include the acceleration of the vehicle based on information input from the finders 20, the radars 30, the camera unit 40, and the like and information indicating whether or not the vehicle is currently changing lanes (or is about to change lanes). The environment recognizing unit 104 may recognize the positions of other objects in addition to the surrounding vehicles, such as crash barriers, utility poles, parked vehicles, and pedestrians.

The action-plan generating unit 106 generates an action plan for a predetermined section. The predetermined section is, for example, a section that includes a toll road such as an expressway, the section being included in the route calculated by the navigation device 50. Note that the action-plan generating unit 106 may generate an action plan for any section in addition to the above section.

The action plan includes, for example, a plurality of events that are performed successively. Examples of the events include a deceleration event in which the subject vehicle M is decelerated, an acceleration event in which the subject vehicle M is accelerated, a lane-keeping event in which the subject vehicle M is made to travel within the traveling lane, a lane-changing event in which the traveling lane is changed, a passing event in which the subject vehicle M is made to pass a vehicle traveling ahead, a branching event in which the traveling lane is changed to a desired lane at a branching point or in which the subject vehicle M is made to travel within the current traveling lane at the branching point, and a merging event in which the subject vehicle M is accelerated or decelerated at a lane-merging point in order to change traveling lanes. For example, if there is a junction (branching point) in a toll road (e.g., expressway), the vehicle control device 100 in automatic-driving mode needs to make the subject vehicle M change lanes or keep the lane in order to move forward toward the destination. Accordingly, if it turns out that the route includes a junction by referring to the map information 152, the action-plan generating unit 106 sets, between the current position (coordinates) of the subject vehicle M and the position (coordinates) of the junction, a lane-changing event for changing lanes to a desired lane in which the subject vehicle M can move forward toward the destination. Note that information indicating the action plan generated by the action-plan generating unit 106 is stored in the storing unit 150 as action-plan information 156.

Figure 4:
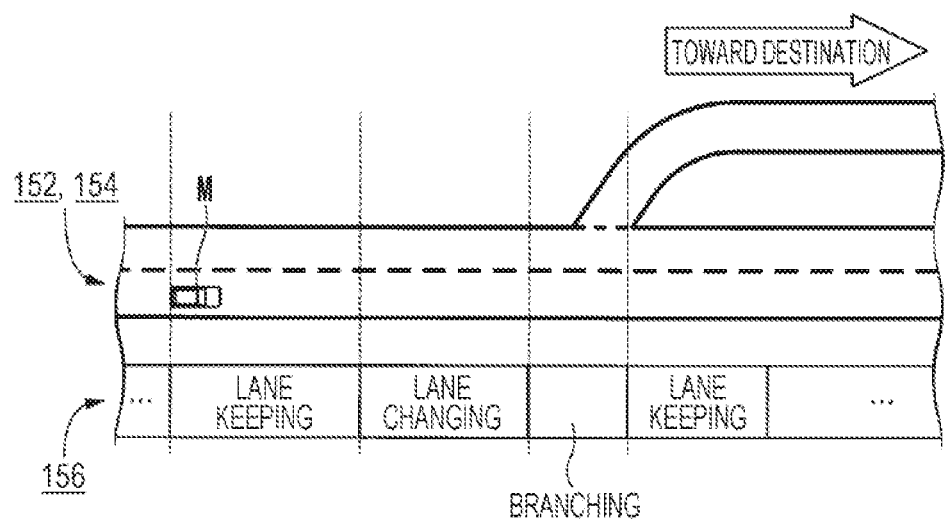
FIG. 4 illustrates an example of an action plan generated for certain sections.

FIG. 4 illustrates an example of an action plan generated for certain sections. As illustrated in FIG. 4, the action-plan generating unit 106 classifies scenes that will occur while traveling along the route to the destination and generates an action plan in such a manner that events will be performed in conformity with the individual scenes. Note that the action-plan generating unit 106 may dynamically change the action plan in accordance with changes in situations of the subject vehicle M.

The action-plan generating unit 106 may change (update) the generated action plan on the basis of, for example, states of environment recognized by the environment recognizing unit 104. While the vehicle is traveling, the states of environment typically keep changing. In particular, if the subject vehicle M is traveling on a road with a plurality of lanes, the distances to other vehicles change. For example, if a vehicle traveling ahead brakes suddenly and decelerates, or if a vehicle traveling in the next lane enters ahead of the subject vehicle M, the subject vehicle M needs to change, while traveling, the velocity or lanes as appropriate in accordance with behaviors of the vehicle traveling ahead or the vehicle traveling in the next lane. Accordingly, in accordance with the above-described change in states of environment, the action-plan generating unit 106 may change an event that has been set for each section.

Specifically, while the subject vehicle M is traveling, if the environment recognizing unit 104 has recognized that the velocity of another vehicle exceeds a threshold or that another vehicle traveling in the next lane of the subject lane is moving toward the subject lane, the action-plan generating unit 106 changes an event set for a section in which the subject vehicle M will travel. For example, in the case where a lane-changing event has been set to be performed after a lane-keeping event, if, according to the recognition result of the environment recognizing unit 104, it turns out during the lane-keeping event that a vehicle in a lane to which the subject vehicle M is to change is moving forward from behind the subject vehicle M at a velocity higher than or equal to a threshold, the action-plan generating unit 106 changes the event that will be performed subsequently to the lane-keeping event from the lane-changing event to, for example, a deceleration event or a lane-keeping event. As a result, even if states of environment have changed, the vehicle control device 100 can implement automatic driving of the subject vehicle M safely.

Lane-Keeping Event

If the traveling control unit 130 performs a lane-keeping event included in an action plan, the lane-keeping control unit 111 determines the traveling mode from among constant-velocity mode, following mode, deceleration mode, cornering mode, obstacle-avoidance mode, and the like.

For example, if there is no vehicle ahead of the subject vehicle M, the lane-keeping control unit 111 determines that the traveling mode is constant-velocity mode. If the subject vehicle M follows a vehicle traveling ahead, the lane-keeping control unit 111 determines that the traveling mode is following mode. If the environment recognizing unit 104 has recognized deceleration of the vehicle traveling ahead, or if the vehicle traveling ahead is to perform an event of stopping or parking, the lane-keeping control unit 111 determines that the traveling mode is deceleration mode. If the environment recognizing unit 104 has recognized that the subject vehicle M is on a curve, the lane-keeping control unit 111 determines that the traveling mode is cornering mode. If the environment recognizing unit 104 has recognized an obstacle ahead of the subject vehicle M, the lane-keeping control unit 111 determines that the traveling mode is obstacle-avoidance mode.

On the basis of the determined traveling mode, the lane-keeping control unit 111 generates a track. The track refers to an aggregate of points (loci) obtained by sampling, for each predetermined period, future target positions at which the subject vehicle M is assumed to arrive if the subject vehicle M travels in the traveling mode determined by the lane-keeping control unit 111. These points may be referred to as track points in the following description.

FIGS. 5A to 5D illustrate examples of tracks generated by the lane-keeping control unit 111. As illustrated in FIG. 5A, for example, the lane-keeping control unit 111 sets, as the track of the subject vehicle M, future target positions such as K(1), K(2), and K(3) on the basis of the current position of the subject vehicle M every time a predetermined period $\Delta t$ passes from the current time point. These target positions are hereinafter simply referred to as "target positions K" unless the target positions are distinguished from one another. The number of target positions K is determined in accordance with, for example, a target time T. For example, if the target time T is five seconds, the lane-keeping control unit 111 sets the target positions K on a line along the center of the traveling lane at every predetermined period $\Delta t$ (e.g., 0.1 seconds) within five seconds and determines the intervals between the plurality of target position K on the basis of the traveling mode. For example, the lane-keeping control unit 111 may calculate the line along the center of the traveling lane from information such as the width of the lane included in the map information 152, or may obtain the information on the line along the center of the traveling lane from the map information 152 if the information is included in the map information 152 in advance.

For example, if it has been determined that the traveling mode is constant-velocity mode, as illustrated in FIG. 5(A), the lane-keeping control unit 111 generates a track by setting the plurality of target positions K at equal intervals. If it has been determined that the traveling mode is deceleration mode (or if vehicle traveling ahead decelerates in following mode), as illustrated in FIG. 5(B), the lane-keeping control unit 111 generates a track in which target positions K at which the subject vehicle M will reach sooner have wider intervals and target positions K at which the subject vehicle M will reach later have narrower intervals. Thus, the traveling control unit 130, which will be described later, decelerates the subject vehicle M because the target positions K at which the subject vehicle M will reach later are closer to the current position of the subject vehicle M.

As illustrated in FIG. 5(C), if the road is curved, the lane-keeping control unit 111 determines that the traveling mode is cornering mode. In this case, the lane-keeping control unit 111 generates a track by, for example, arranging the plurality of target positions K while changing lateral positions (positions in width direction of lane) of the subject vehicle M relative to the traveling direction in accordance with the curvature of the road. As illustrated in FIG. 5(D), if there is an obstacle OB such as a person or stationary vehicle on the road ahead of the subject vehicle M, the lane-keeping control unit 111 determines that the traveling mode is obstacle-avoidance mode. In this case, the lane-keeping control unit 111 generates a track by arranging the plurality of target positions K in such a manner that the subject vehicle M travels to avoid the obstacle OB.

Lane-Changing Event

The lane-changing control unit 112 performs control if the traveling control unit 130 performs a lane-changing event included in an action plan. Note that the lane-changing control unit 112 may perform the following process not only when a lane-changing event is performed, but also when the traveling control unit 130 performs a branching event or a merging event.

The lane-changing control unit 112 specifies a vehicle traveling ahead of the subject vehicle M in a next lane L2, which is next to the lane (subject lane) in which the subject vehicle M is traveling, and a vehicle traveling behind the subject vehicle M in the next lane L2 and sets a target position TA between these vehicles. Hereinafter, the vehicle traveling ahead of the target position TA is referred to as a forward reference vehicle, and the vehicle traveling behind the target position TA is referred to as a backward reference vehicle. The target position TA is a relative position based on a positional relationship between the subject vehicle M, the forward reference vehicle, and the backward reference vehicle.

Note that the lane-changing control unit 112 may set a plurality of target positions TA in the next lane L2 and may select one target position TA (or predetermined number of target positions TA) from among the plurality of target positions TA. For example, the lane-changing control unit 112 may set a target position TA in each of a backward region of the backward reference vehicle mC (between backward reference vehicle mC and vehicle behind backward reference vehicle mC), a forward region of the forward reference vehicle mB (between forward reference vehicle mB and vehicle ahead of forward reference vehicle mB), and a region between the forward reference vehicle mB and the backward reference vehicle mC, and may select one target position TA from among the plurality of target positions TA. Note that this embodiment describes for brevity that the lane-changing control unit 112 sets one target position TA between the forward reference vehicle mB and the backward reference vehicle mC.

Figure 6:
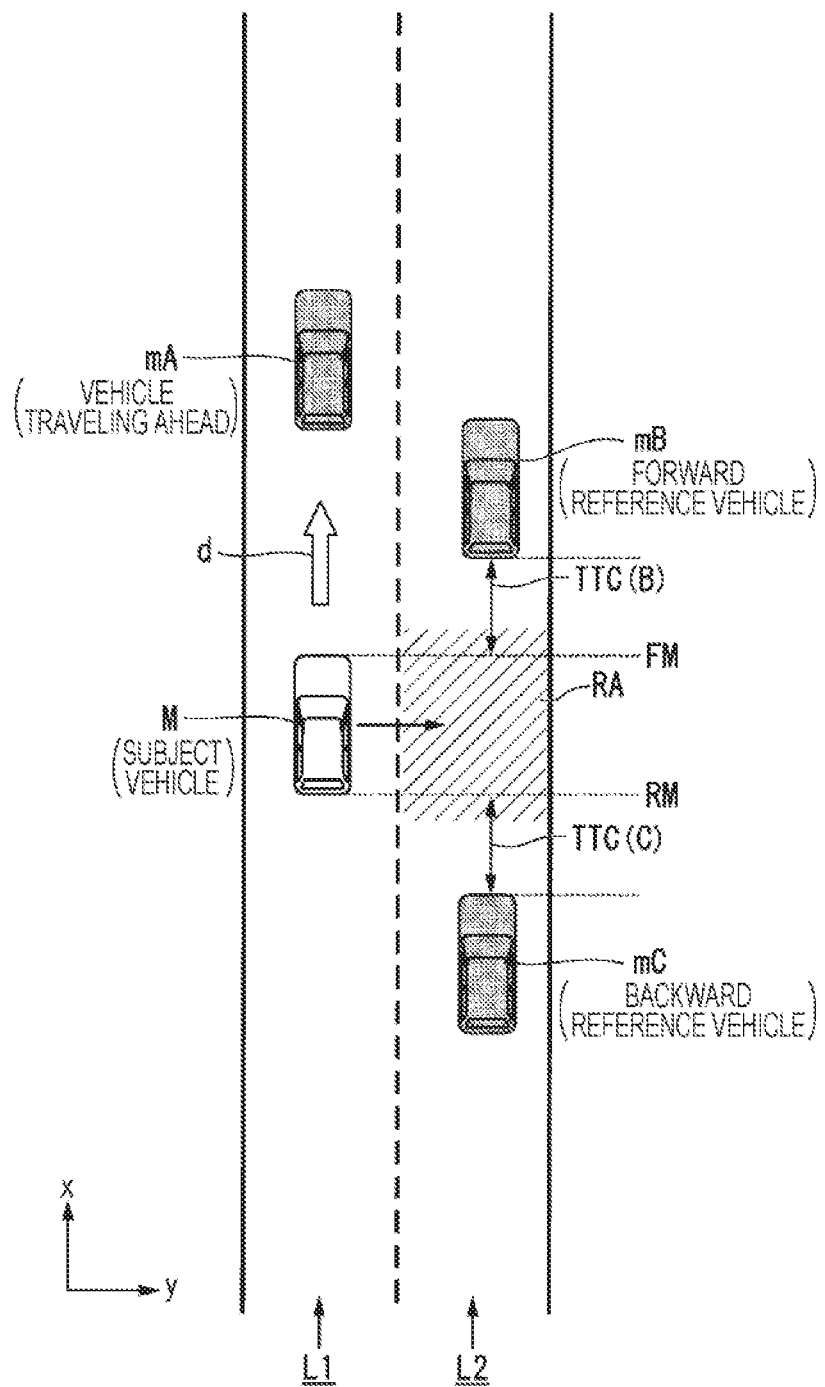
FIG. 6 illustrates a method for setting a prohibition region.

The lane-changing control unit 112 sets a prohibition region RA obtained by projecting the subject vehicle M to the lane L2, to which the subject vehicle M is to change, and by giving some marginal distances in front and behind. Now, a method for setting the prohibition region RA will be described with reference to FIG. 6. FIG. 6 illustrates the method for setting the prohibition region RA. As illustrated in FIG. 6, the prohibition region RA is set as a region that extends from one end of the lane L2 to the other end in the lateral direction. If even a part of a surrounding vehicle is present in the prohibition region RA, the lane-changing control unit 112 determines that it is not possible to change lanes to the lane including the target position TA.

If there is no surrounding vehicle in the prohibition region RA, the lane-changing control unit 112 further determines whether or not it is possible to change lanes on the basis of a time-to-collision (TTC) between the subject vehicle M and a surrounding vehicle. The lane-changing control unit 112 assumes, for example, an imaginary extended line FM and an imaginary extended line RM that extend from the front end and rear end of the subject vehicle M toward the lane L2, to which the subject vehicle M is to change. The lane-changing control unit 112 calculates a time-to-collision TTC(B) between the extended line FM and the forward reference vehicle mB and a time-to-collision TTC(C) between the extended line RM and the backward reference vehicle mC. The time-to-collision TTC(B) is a time calculated by dividing the distance between the extended line FM and the forward reference vehicle mB by a relative velocity between the subject vehicle M and the forward reference vehicle mB. The time-to-collision TTC(C) is a time calculated by dividing the distance between the extended line RM and the backward reference vehicle mC by a relative velocity between the subject vehicle M and the backward reference vehicle mC. If the time-to-collision TTC(B) exceeds a threshold Th(B) and the time-to-collision TTC(C) exceeds a threshold Th(C), the lane-changing control unit 112 determines that it is possible for the subject vehicle M to change lanes to be at the target position TA.

In addition, the lane-changing control unit 112 may determine whether or not it is possible for the subject vehicle M to change lanes to be at the target position TA, by taking into account the velocity, acceleration, jerk, or the like of the vehicle mA traveling ahead, the forward reference vehicle mB, and the backward reference vehicle mC. For example, if the velocity of each of the forward reference vehicle mB and the backward reference vehicle mC is higher than the velocity of the vehicle mA traveling ahead and it is predicted that the forward reference vehicle mB and the backward reference vehicle mC will pass the vehicle mA traveling ahead within a time necessary for the subject vehicle M to change lanes, the lane-changing control unit 112 may determine that it is not possible for the subject vehicle M to change lanes to be at the target position TA, which has been set between the forward reference vehicle mB and the backward reference vehicle mC.

In accordance with whether it is possible to change lanes to the lane in which the subject vehicle M is to be at the target position TA, the lane-changing control unit 112 generates a track in which the subject vehicle M is made to change lanes to be at the target position TA. As in the above-described track generated by the lane-keeping control unit 111, this track is an aggregate of track points (loci) obtained by sampling, for each predetermined period, future target position of the subject vehicle M.

For example, if it has been determined that it is possible for the subject vehicle M to change lanes, the lane-changing control unit 112 generates a track in which the subject vehicle M is made to change lanes to be at the target position TA; if it has been determined that it is not possible for the subject vehicle M to change lanes, the lane-changing control unit 112 does not generate a track in which the subject vehicle M is made to change lanes to be at the target position TA but generates a track in which the subject vehicle M keeps the current lane. The track in which the subject vehicle M keeps the current lane is, for example, a track in which the subject vehicle M travels constantly at the current velocity, a track in which the subject vehicle M is decelerated from the current velocity, a track in which the subject vehicle M travels in accordance with the curvature of the road, or the like, as in the track generated by the lane-keeping control unit 111.

Figure 7:
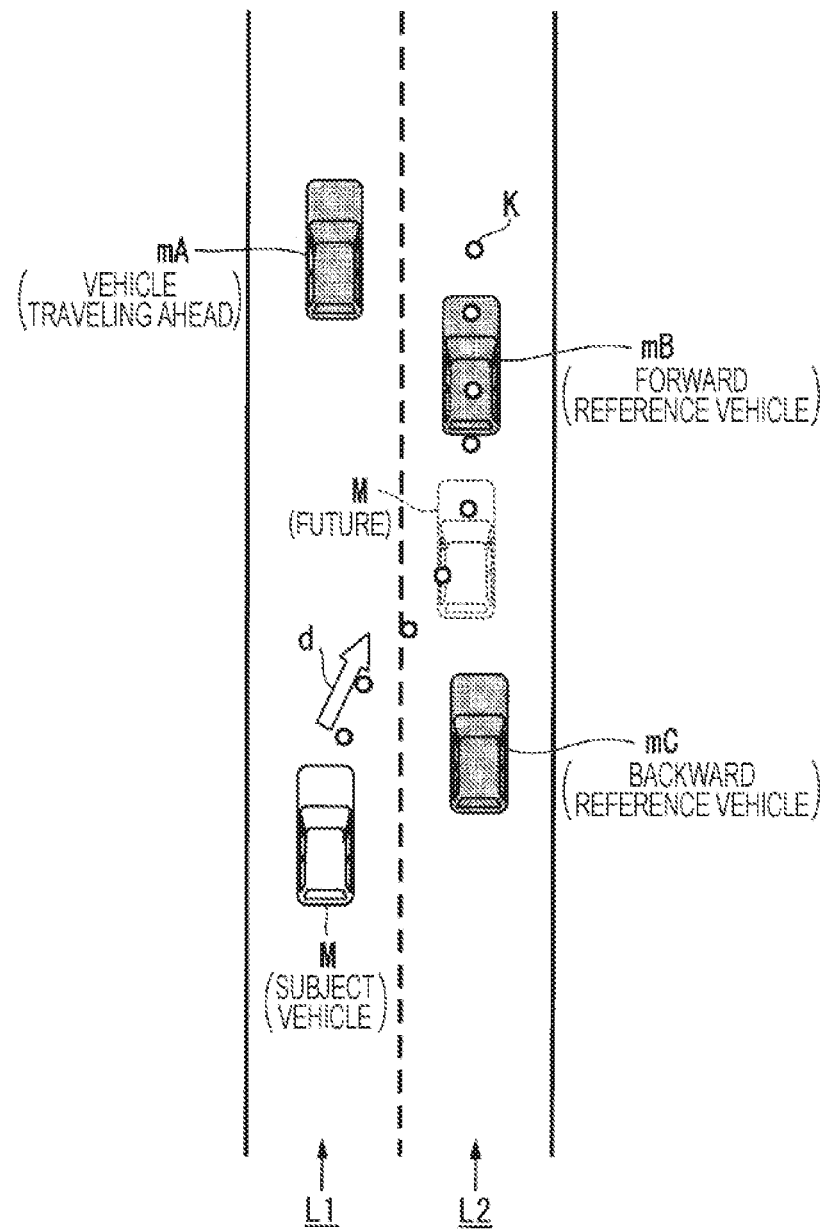
FIG. 7 illustrates a method for generating a track by a lane-changing control unit.

FIG. 7 illustrates a method for generating a track by the lane-changing control unit 112. For example, the lane-changing control unit 112 assumes that the forward reference vehicle mB and the backward reference vehicle mC travel with a predetermined velocity model (e.g., velocity model in which velocity recognized by the environment recognizing unit 104 is constant). On the basis of the velocity models of the two vehicles and the velocity of the subject vehicle M, the lane-changing control unit 112 generates a track in which the subject vehicle M will be present at a certain future time point between the forward reference vehicle mB and the backward reference vehicle mC without interfering of the subject vehicle M with the vehicle mA traveling ahead. For example, the lane-changing control unit 112 smoothly connects the current position of the subject vehicle M to the position of the forward reference vehicle mB at a certain future time point by using a polynomial curve such as a spline curve and arranges a predetermined number of target positions K at equal or unequal intervals on the curve. At this time, the lane-changing control unit 112 generates a track in which at least one of the target positions K is arranged at the target position TA.

Merging Event

The merging control unit 113 performs control if the traveling control unit 130 performs a merging event included in an action plan.

The merging control unit 113 generates a track in which the subject vehicle M is made to change lanes from the subject lane to a lane (hereinafter referred to as a merging lane) that merges with the subject lane in accordance with the velocity of the subject vehicle M and the velocity of a vehicle mD traveling in the merging lane. This track is, as in the above-described track generated by the lane-keeping control unit 111 or the lane-changing control unit 112, an aggregate of track points (loci) obtained by sampling, for each predetermined period, future target positions of the subject vehicle M.

Figure 8:
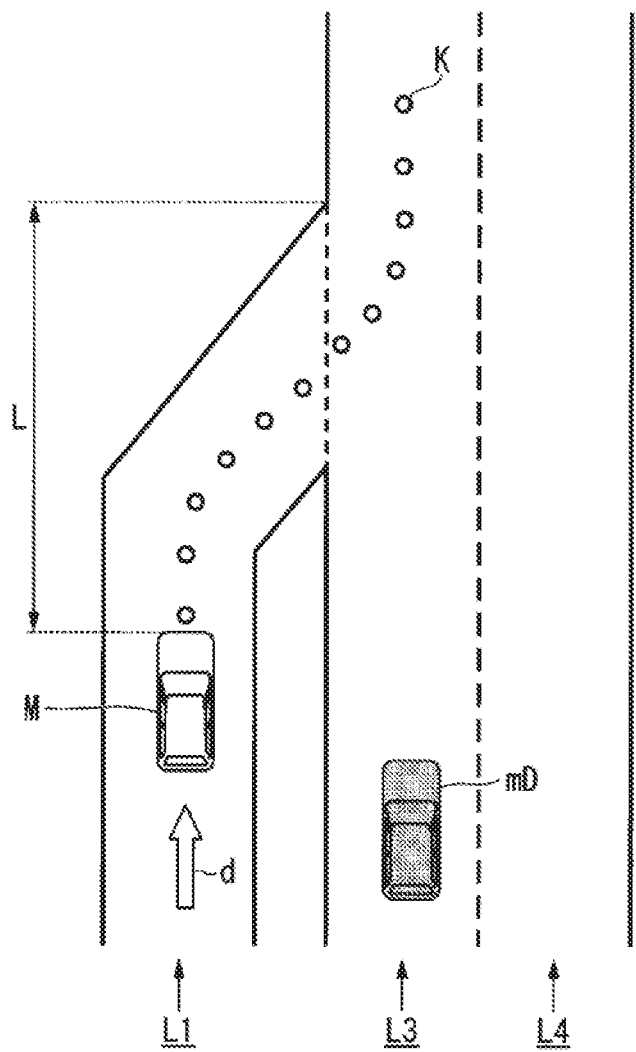
FIG. 8 illustrates an example of a scene in which traveling lanes are reduced.

FIG. 8 illustrates an example of a scene in which traveling lanes are reduced. As illustrated in FIG. 8, for example, if the subject vehicle M is traveling in the lane L1 to be reduced as the subject lane, on the basis of a distance L from the current position of the subject vehicle M to a point at which the subject lane L1 ends and the velocity of the subject vehicle M, the merging control unit 113 calculates a remaining time that is left for the subject vehicle M to change lanes from the subject lane L1 to a merging lane L3. On the basis of the calculated remaining time and the velocity of the vehicle mD traveling in the merging lane L3, the merging control unit 113 determines the velocity of the subject vehicle M. The merging control unit 113 generates a track K in which track points are arranged at intervals based on the determined velocity.

For example, the merging control unit 113 calculates, as the remaining time, a time that is necessary if the subject vehicle M is made to travel the distance L with a constant-velocity model in which the velocity of the subject vehicle M is constant. Then, the merging control unit 113 generates a track in which the subject vehicle M is accelerated or decelerated within the remaining time to merge with the merging lane L3. If, for example, the velocity of the vehicle mD is lower than the velocity of the subject vehicle M, the merging control unit 113 generates a track K in which the subject vehicle M enters ahead of the vehicle mD while maintaining the current velocity of the subject vehicle M and preventing the curve of the track K from the subject lane L1 to the merging lane L3 from being sharp.

On the other hand, if the velocity of the vehicle mD is higher than the velocity of the subject vehicle M, the merging control unit 113 generates a track K in which the subject vehicle M is sufficiently accelerated within the distance L in order to travel at the same velocity of the vehicle mD or higher to enter ahead of the vehicle mD. In addition, if the velocity of the vehicle mD is higher than the velocity of the subject vehicle M and it is not possible for the subject vehicle M to be sufficiently accelerated within the distance L, the merging control unit 113 generates a track in which the subject vehicle M enters behind the vehicle mD.

Branching Event

The branching control unit 114 performs control if the traveling control unit 130 performs a branching event included in an action plan.

For example, in accordance with the velocity of the vehicle mA traveling ahead and the velocity of the subject vehicle M, the branching control unit 114 generates a track in which the subject vehicle M is made to change lanes from the subject lane to a branching lane. This track is, as in the above-described track generated by the lane-keeping control unit 111, the lane-changing control unit 112, or the merging control unit 113, an aggregate of track points (loci) obtained by sampling, for each predetermined period, future target positions of the subject vehicle M.

Figure 9:
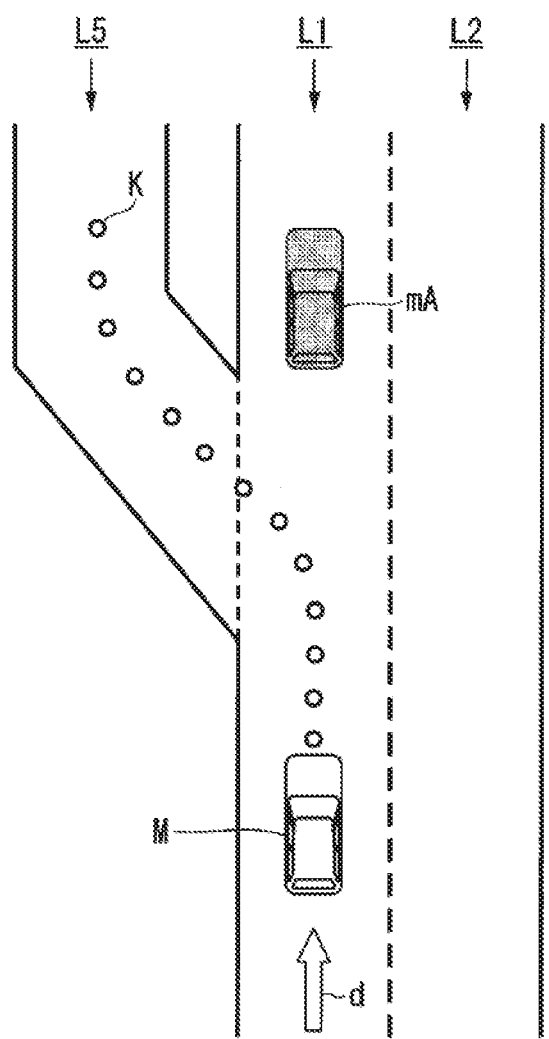
FIG. 9 illustrates an example of a scene in which traveling lanes are increased.

FIG. 9 illustrates an example of a scene in which traveling lanes are increased. As illustrated in FIG. 9, for example, if the subject vehicle M is traveling in the subject lane L1, the branching control unit 114 generates a track K in which the subject vehicle M changes lanes to a branching lane L5 by accelerating or decelerating the subject vehicle M at such a velocity that the subject vehicle M does not pass the vehicle mA traveling ahead.

Detection of Towing State

The towing-state detecting unit 145 determines whether or not the object DO detected by a sound wave sensor, a camera, and the like included in the towing detection sensor 85 is an object to be towed by the subject vehicle M. If the object DO is an object to be towed, the towing-state detecting unit 145 detects that the subject vehicle M is in a state of towing the object DO, which is the object to be towed. For example, if the size of the object DO is larger than or equal to a threshold, the towing-state detecting unit 145 determines that the object DO is the object to be towed.

Figure 10:
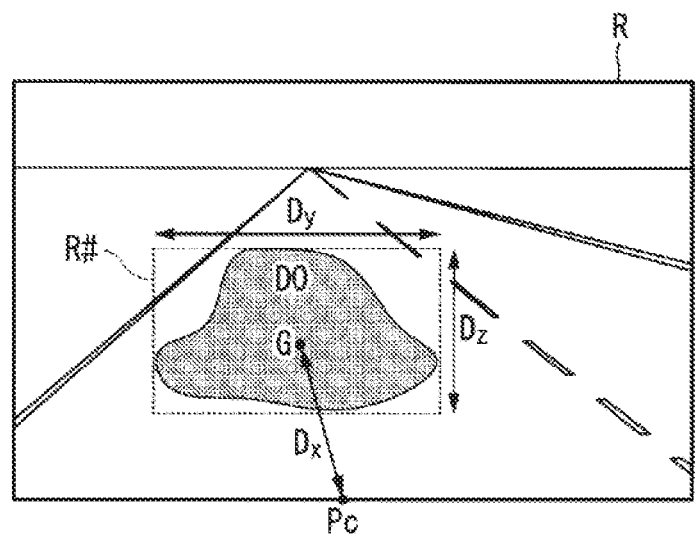
FIG. 10 schematically illustrates an example of a scene in which a towing detection sensor detects an object.

FIG. 10 schematically illustrates an example of a scene in which the towing detection sensor 85 detects the object DO. In the case of the example illustrated in FIG. 10, the threshold is set, for example, for an area ratio of a region R# of the object DO to a detection region R of a sound wave sensor, an infrared sensor, a camera, or the like. The threshold may alternatively be set for each of a size $D_z$ of the object DO in the vertical direction (height direction) and a size $D_y$ of the object DO in the width direction (same direction as width direction of lane). The threshold may further alternatively be set for a distance $D_x$ from the subject vehicle M to the object DO. The distance $D_x$ is calculated as a distance from a reference point (e.g., point Pc) in the detection region R to a reference point (e.g., center of gravity G) of the object DO.

In addition, if the object DO detected by a sound wave sensor, a camera, and the like included in the towing detection sensor 85 follows the subject vehicle M for a certain period or longer during forward movement of the subject vehicle M, the towing-state detecting unit 145 detects the object DO as an object to be towed. The term "follow" means, for example, a state in which the above-described distance $D_x$ from the subject vehicle M to the object DO is smaller than or equal to a threshold, that is, a case where the interval between the subject vehicle M and the object DO is smaller than or equal to a certain distance.

In addition, if the object DO detected by a sound wave sensor, a camera, and the like included in the towing detection sensor 85 follows the subject vehicle M for a certain period or longer during backward movement of the subject vehicle M, the towing-state detecting unit 145 temporarily suspends the process for determining whether or not the object DO is an object to be towed, taking into account the case where the object DO detected by the towing detection sensor 85 is not an object to be towed but an obstacle that approaches the subject vehicle M due to the backward movement of the subject vehicle M.

In addition, if each of a plurality of sensors such as a sound wave sensor, an infrared sensor, and a camera included in the towing detection sensor 85 has detected the object DO and then any of the sensors no longer detects the object DO on a curved road, for example, the towing-state detecting unit 145 retains the determination result that the object DO is an object to be towed on the basis of the detection results of the other sensors.

In addition, if the towing detection sensor 85 is a sensor provided for a connecting member such as a trailer hitch or a sensor provided for a driving mechanism that drives the connecting member, because an object to be towed is attached to the connecting member, the towing-state detecting unit 145 detects that the subject vehicle M is in a state of towing the object DO detected by the towing detection sensor 85 as an object to be towed.

Traveling Control

Under control of the changing unit 140, the traveling control unit 130 sets the control mode to automatic-driving mode or manual-driving mode, and in accordance with the set control mode, the traveling control unit 130 controls a control target including one or all of the traveling-driving-force output device 90, the steering device 92, and the braking device 94. In automatic-driving mode, the traveling control unit 130 reads the action-plan information 156 generated by the action-plan generating unit 106 and controls the control target on the basis of an event included in the read action-plan information 156.

For example, in accordance with a target velocity on the tracks generated by the lane-keeping control unit 111, the lane-changing control unit 112, the merging control unit 113, and the branching control unit 114, the traveling control unit 130 determines a control amount (e.g., rotational speed) of an electric motor in the steering device 92 and a control amount (e.g., throttle opening degree of engine, shift stage, or the like) of the ECU in the traveling-driving-force output device 90. In addition, the traveling control unit 130 determines a control amount of the electric motor in the steering device 92 in accordance with an angle formed by a line in the traveling direction of the subject vehicle M at each target position K and a line in the direction of the next target position on the basis of the target position.

The traveling control unit 130 outputs information indicating the control amount to the corresponding control target. Accordingly, each of the traveling-driving-force output device 90, the steering device 92, and the braking device 94, which are control targets, can control the subject vehicle M in accordance with the information indicating the control amount, input from the traveling control unit 130. In addition, on the basis of the detection result of the vehicle sensor 60, the traveling control unit 130 adjusts the determined control amount as appropriate.

Switching of Driving Mode

On the basis of the action-plan information 156 that has been generated by the action-plan generating unit 106 and stored in the storing unit 150, the changing unit 140 changes the control mode for controlling the subject vehicle M by the traveling control unit 130 from automatic-driving mode to manual-driving mode or from manual-driving mode to automatic-driving mode.

In addition, on the basis of a control-mode specification signal input from the switch 80, the changing unit 140 changes the control mode for controlling the subject vehicle M by the traveling control unit 130 from automatic-driving mode to manual-driving mode or from manual-driving mode to automatic-driving mode. That is, the control mode of the traveling control unit 130 can be changed freely by an operation performed by a vehicle occupant during traveling or parking.

In addition, on the basis of an operation detection signal input from the operation detection sensor 72, the changing unit 140 changes the control mode for controlling the subject vehicle M by the traveling control unit 130 from automatic-driving mode to manual-driving mode. For example, if the operation amount included in the operation detection signal exceeds a threshold, that is, if the operation device 70 has received an operation with an operation amount exceeding a threshold, the changing unit 140 changes the control mode of the traveling control unit 130 from automatic-driving mode to manual-driving mode. For example, while the subject vehicle M is being automatically driven under control of the traveling control unit 130 in automatic-traveling mode, if a driver has operated a steering wheel, an accelerator pedal, or a brake pedal with an operation amount exceeding a threshold, the changing unit 140 changes the control mode of the traveling control unit 130 from automatic-driving mode to manual-driving mode. Accordingly, by the driver's instant operation performed when an object such as a person runs out into the street or when the vehicle traveling ahead suddenly brakes, the vehicle control device 100 can immediately switch the control mode to manual-driving mode without an operation on the switch 80. As a result, the vehicle control device 100 can cope with the driver's operation of emergency, thereby increasing the safety during traveling.

In addition, if the towing-state detecting unit 145 has detected that the subject vehicle M is in a state of towing an object to be towed or if a vehicle occupant has registered in advance through the navigation device 50 or the information input/output device 65 that the subject vehicle M is a towing vehicle that tows an object to be towed, the changing unit 140 prohibits automatic-driving mode for a section corresponding to a predetermined event and permits automatic-driving mode for a section not corresponding to the predetermined event among sections in which events included in an action plan are supposed to be performed.

Examples of the predetermined event include one or all of a lane-changing event, a merging event, and a branching event. In this case, only driving in manual-driving mode is to be implemented in the section in which automatic-driving mode is prohibited, such as the section corresponding to the lane-changing event, the merging event, or the branching event.

The term "prohibition" of automatic-driving mode may mean, for example, prohibition of reading of information on a predetermined event at the time the traveling control unit 130 reads the action-plan information 156, or prohibition of determination of a control amount for each control target corresponding to a predetermined event, the determination being performed by the traveling control unit 130, after reading of the action-plan information 156. In addition, the term "prohibition" of automatic-driving mode may also mean prohibition of the generation of information on a predetermined event at the time the action-plan generating unit 106 generates the action-plan information 156.

Even in a section corresponding to the predetermined event, the changing unit 140 may permit some automatic-driving mode under condition that conditions for implementing automatic driving for each event are changed in such a manner that it is unlikely to implement automatic driving.

For example, in a lane-changing event, the changing unit 140 enlarges the area of the prohibition region RA or increases the value of a threshold Th set for the time-to-collision TTC, thereby making it unlikely for the lane-changing control unit 112 to determine that lane changing is possible. In addition, for example, in a lane-changing event, the changing unit 140 provides a restriction on the maximum velocity, a steering angle, or the like that can be output by the subject vehicle M, thereby making it unlikely for the lane-changing control unit 112 to generate a track in which lane changing is completed within a period in which lane changing is possible (e.g., period before backward reference vehicle mC reaches forward reference vehicle mB).

In a merging event or branching event, the changing unit 140 provides a restriction on the maximum velocity or a steering angle that, can be output by the subject vehicle M, the distance to a surrounding vehicle, or the like, thereby making it unlikely for the merging control unit 113 or the branching control unit 114 to generate a track in which the event is realized. With such control, even if there is an object to be towed, the vehicle control device 100 can realize safe automatic driving.

For example, if the maximum velocity of the subject vehicle M is changed while the subject vehicle M is in a towing state, the changing unit 140 sets the maximum velocity of the subject vehicle M to a lower value than the maximum velocity of the subject vehicle M to be set if the towing-state detecting unit 145 has not detected that the subject vehicle M is in a state of towing an object to be towed.

In addition, if the distance to a surrounding vehicle (or area of prohibition region RA) is changed while the subject vehicle M is in a towing state, the changing unit 140 sets the distance to the surrounding vehicle (or area of prohibition region RA) to a value larger than a distance (or area of prohibition region RA) to be set if the towing-state detecting unit 145 has not detected that the subject vehicle M is in a state of towing an object to be towed.

In addition, if the steering angle of the subject vehicle M is changed while the subject vehicle M is in a towing state, the changing unit 140 sets the steering angle of the subject vehicle M to a value smaller than a steering angle to be set if the towing-state detecting unit 145 has not detected that the subject vehicle M is in a state of towing an object to be towed.

Furthermore, if it is not possible to implement automatic driving as a result of change of such implementation conditions, the changing unit 140 notifies a vehicle occupant through the navigation device 50 or the information input/output device 65 of information indicating that manual driving is necessary in order to cause the driver to perform manual driving.

In a section not corresponding to a predetermined event (e.g., lane-keeping event), the changing unit 140 may also provide restrictions on conditions for implementing automatic driving for each event and permit automatic-driving mode. For example, in a lane-keeping event, if the maximum velocity that can be output by the subject vehicle M is set to a legally permitted speed, the changing unit 140 changes the maximum velocity to a velocity that corresponds to about 80% of the legally permitted speed and provides a restriction on the velocity during lane keeping.

In addition, if the towing-state detecting unit 145 has detected that the subject vehicle M is in a state of towing an object to be towed before the subject vehicle M arrives at a starting point of a section in which automatic driving is supposed to be implemented according to an action plan, the changing unit 140 cancels (deletes) the setting of the section in which automatic driving is supposed to be implemented and notifies a vehicle occupant through the navigation device 50 or the information input/output device 65 of information indicating that the setting of the automatic-driving section has been canceled. Accordingly, the vehicle control device 100 can refrain from implementing automatic driving if, for example, the driver has set an automatic-driving section without registering the subject vehicle M as a towing vehicle and has attached an object to be towed to the subject vehicle M before the subject vehicle M arrives at the starting point of this section.

A scene in which automatic-driving mode is switched to manual-driving mode as a result of detection of an object to be towed will be described below with reference to drawings. Note that the following description will be given on the assumption that automatic-driving mode is prohibited and only driving in manual-driving mode is implemented upon detection of an object to be towed. However, as described above, automatic-driving mode may be permitted by changing conditions for implementing automatic driving for each event.

Figure 11:
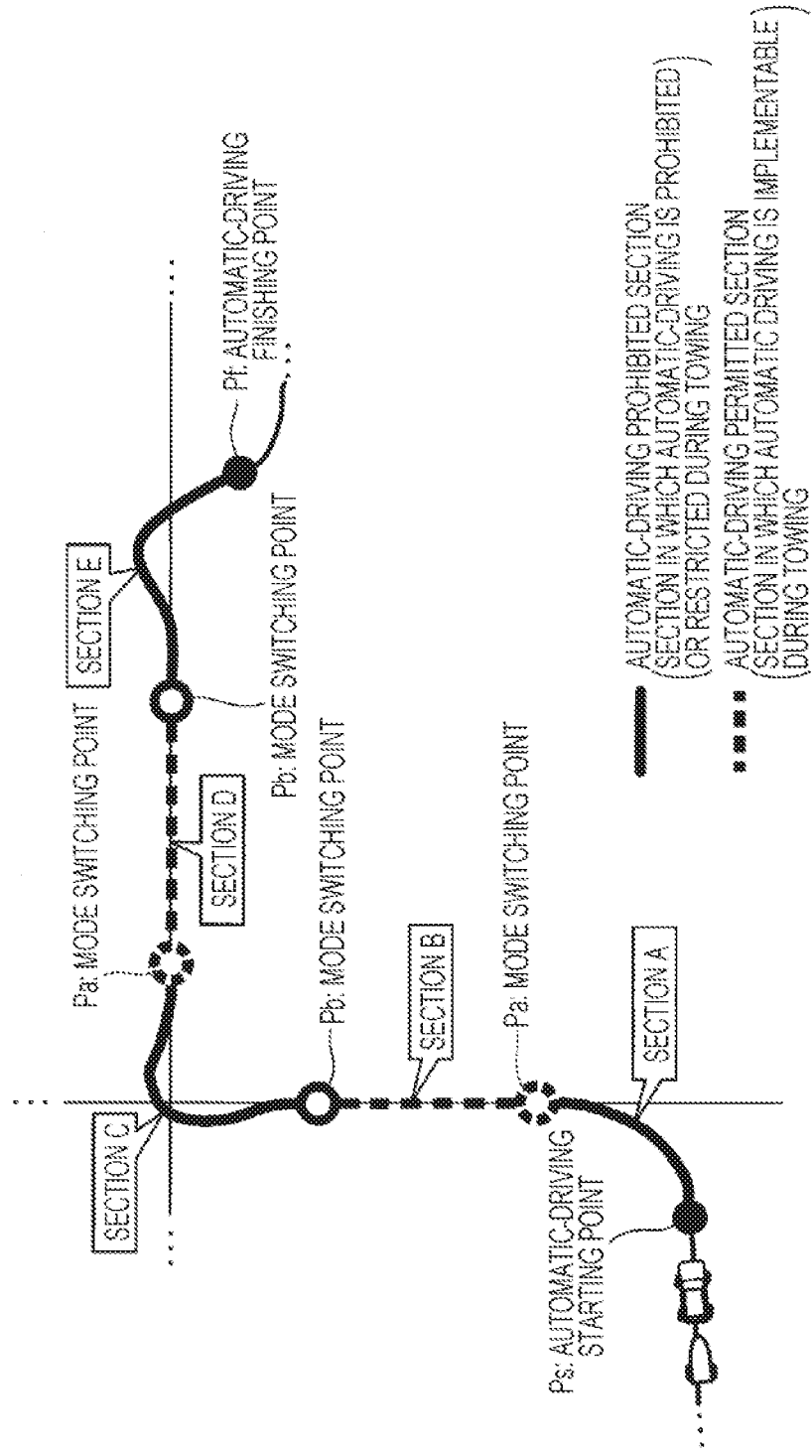
FIG. 11 illustrates an example of a scene in which an object to be towed is detected before starting of automatic driving.

FIG. 11 illustrates an example of a scene in which an object to be towed is detected before starting of automatic driving. A section A illustrated in FIG. 11 denotes a section in which merging is necessary, a section B and a section D each denote a section in which lane keeping is necessary, a section C denotes a section in which lane changing is necessary, and a section E denotes a section in which branching is necessary.

For example, upon setting, by a vehicle occupant, of an automatic-driving starting point Ps and a automatic-driving finishing point Pf on a map through the navigation device 50, the action-plan generating unit 106 generates an action plan. At this time point, if it has been detected that the subject vehicle M is in a state of towing an object to be towed or if the vehicle occupant has registered the subject vehicle M as a towing vehicle, the changing unit 140 changes a section in which driving in automatic-driving mode has been supposed to be implemented to a section in which only driving in manual-driving mode is implemented.

In the example illustrated in FIG. 11, the changing unit. 140 sets, as a section in which automatic-driving mode is prohibited, each of the section A in which merging is necessary, the section C in which lane changing is necessary, and the section E in which branching is necessary. In such a case, the changing unit 140 notifies a vehicle occupant through the navigation device 50 or the information input/output device 65 that there are sections in which manual driving is necessary in the automatic-driving section (section from starting point Ps to finishing point Pf) set by the vehicle occupant. In addition, while driving in automatic-driving mode is implemented, at a point that is before by a predetermined distance from the point (Pb in FIG. 11) where the automatic-driving mode is switched to manual-driving mode, the changing unit 140 notifies the vehicle occupant that manual driving is necessary in the next section. Accordingly, the vehicle control device 100 can have a time necessary to start manual driving. Furthermore, if there is an object to be towed, typically, the driver infrequently changes lanes or travels at a high velocity, for example, during manual driving. Accordingly, even if driving in automatic-driving mode is implemented only for a specific event, automatic driving is implemented for other events that are performed frequently, thereby reducing a load of the driver's operations.

Figure 12:
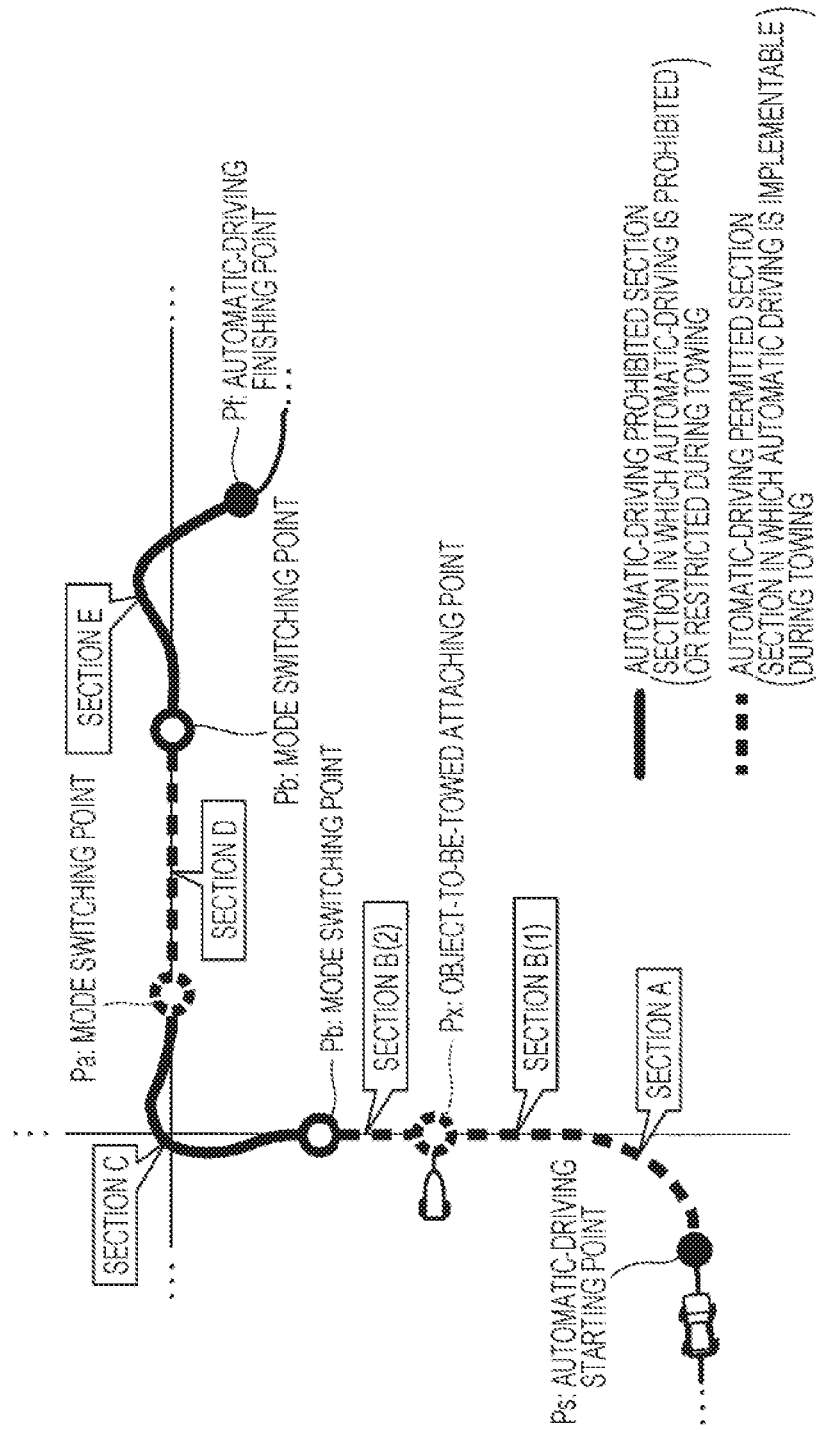
FIG. 12 illustrates an example of a scene in which an object-to be towed is detected after starting of automatic driving.

FIG. 12 illustrates an example of a scene in which an object to be towed is detected after starting of automatic driving. For example, if an object to be towed has not been detected before the automatic-driving starting point Ps, or a vehicle occupant has not registered the subject vehicle M as a towing vehicle before the automatic-driving starting point Ps, the section A though the section E illustrated in FIG. 12 are each set as a section in which automatic driving is implemented in accordance with an event included in an action plan.

For example, in the state where all of the sections have been set as sections in which driving in automatic-driving mode is implemented, if a vehicle occupant has attached an object to be towed to the subject vehicle M at a point Px as illustrated in FIG. 12, the towing-state detecting unit 145 detects the object to be towed at the point Px. Accordingly, the changing unit 140 sets again each of the sections after the point Px, i.e., from a section B(2) to the section E, as a section in which automatic-driving mode is permitted or a section in which automatic-driving mode is prohibited. In the example illustrated in FIG. 12, a section B(1) is a section in which lane keeping is necessary, and accordingly, in the section B(2), the setting is maintained, that is, the section B(2) is set as a section in which driving in automatic-driving mode is implemented. In addition, in the section C and the section E, automatic-driving mode is prohibited as in FIG. 11.

Figure 13:
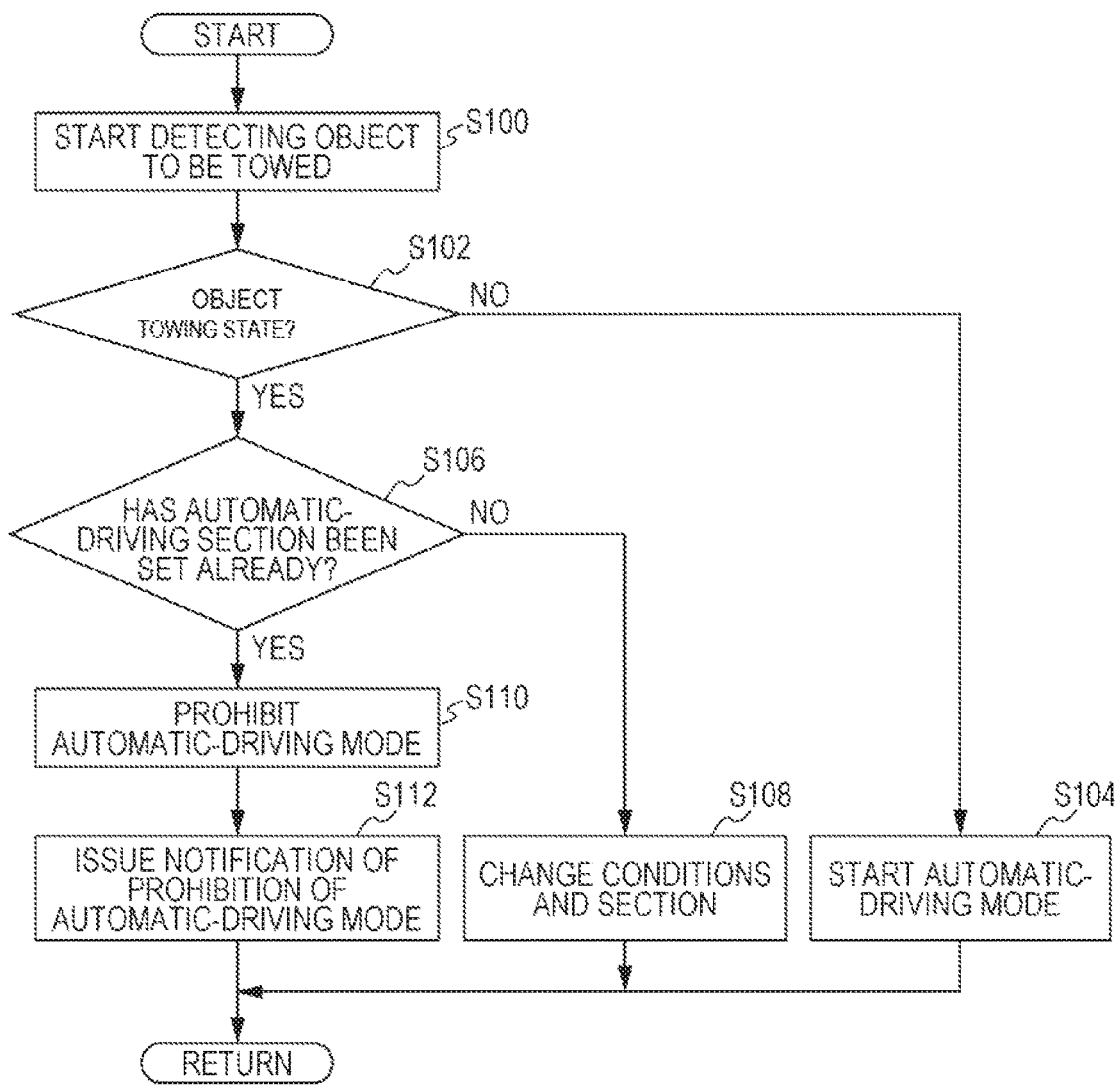
FIG. 13 is a flowchart illustrating an example of a process flow of the vehicle control device in the embodiment.

Hereinafter, the flow of a series of processes performed by the vehicle control device 100 in the embodiment will be described. FIG. 13 is a flowchart illustrating an example of a process flow of the vehicle control device 100 in the embodiment. The processes in the flowchart are repeatedly performed in a predetermined cycle.

First, the towing-state detecting unit 145 starts a process for detecting an object to be towed (step S100). Then, the vehicle control device 100 determines whether or not the towing-state detecting unit 145 has detected that the subject vehicle M is in a state of towing an object to be towed (step S102). If the towing-state detecting unit 145 has not detected that the subject vehicle M is in a state of towing an object to be towed, the traveling control unit 130 starts automatic-driving mode and controls a control target on the basis of each event included in an action plan generated by the action-plan generating unit 106 (step S104).

On the other hand, if the towing-state detecting unit 145 has detected that the subject vehicle M is in a state of towing an object to be towed, the changing unit 140 determines whether or not a vehicle occupant has already set an automatic-driving section (starting point Ps and finishing point Pf) (step S106). If the automatic-driving section has not been set, the changing unit 140 changes conditions for implementing automatic driving for each event and causes the vehicle occupant to set an automatic-driving section (step S108) by, for example, displaying in an enhanced manner a section in which automatic-driving mode is prohibited and a section in which automatic-driving mode is permitted on a map displayed by the navigation device 50. Accordingly, the vehicle occupant, can recognize the section in which manual driving is to be implemented during a towing state and then set an automatic-driving section.

On the other hand, upon setting of the automatic-driving section, if there is a section corresponding to a predetermined event among the sections in which automatic-driving mode is permitted, the changing unit 140 notifies the vehicle occupant through the information input/output device 65 that automatic-driving mode is prohibited for the section corresponding to a predetermined event (step S110). Then, the changing unit 140 prohibits automatic-driving mode for the section corresponding to the predetermined event (step S112), thereby ending the processes in the flowchart.

Figure 14:
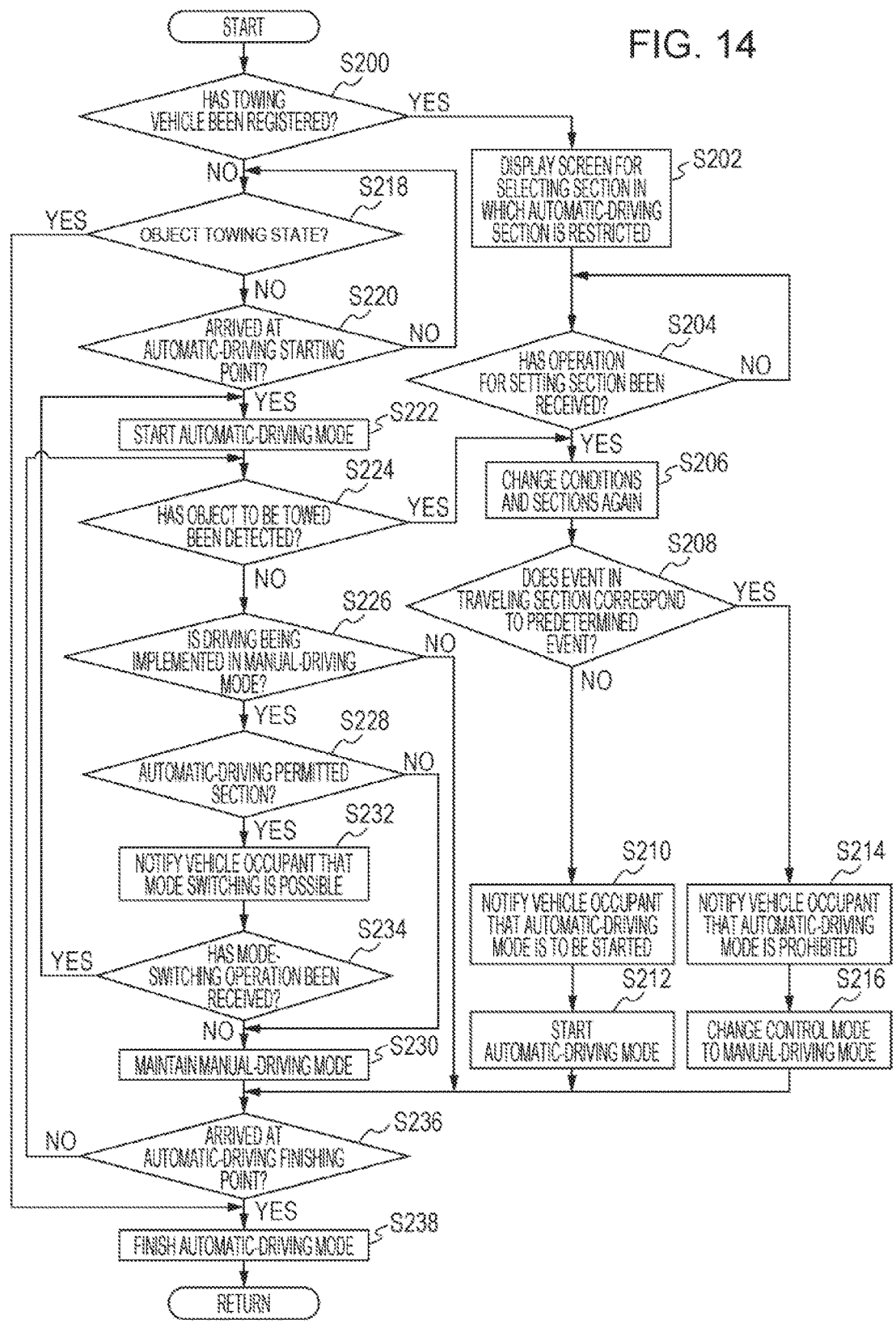
FIG. 14 is a flowchart illustrating another example of the process flow of the vehicle control device in the embodiment.

Note that the vehicle control device 100 according to the embodiment may perform the process corresponding to a flowchart that will be described below instead of the above-described flowchart illustrated in FIG. 13. FIG. 14 is a flowchart, illustrating another example of the process flow of the vehicle control device 100 in the embodiment. In the processes in this flowchart, a vehicle occupant sets an automatic-driving section, and automatic driving is implemented in the state where the action-plan generating unit 106 has generated an action plan in which various events are set for each section.

First, the vehicle control device 100 determines whether or not the subject vehicle M has been registered as a towing vehicle (step S200). If the subject vehicle M has been registered as a towing vehicle, the changing unit 140 changes conditions for implementing automatic driving for each event and, for example, causes the information input/output device 65 to display in an enhanced manner a section in which automatic-driving mode is prohibited and a section in which automatic-driving mode is permitted on a map and to display a screen for causing a vehicle occupant to select whether the section in which automatic-driving mode is permitted is maintained without change or is changed to be a section in which automatic-driving mode is prohibited (step S202).

Figure 15:
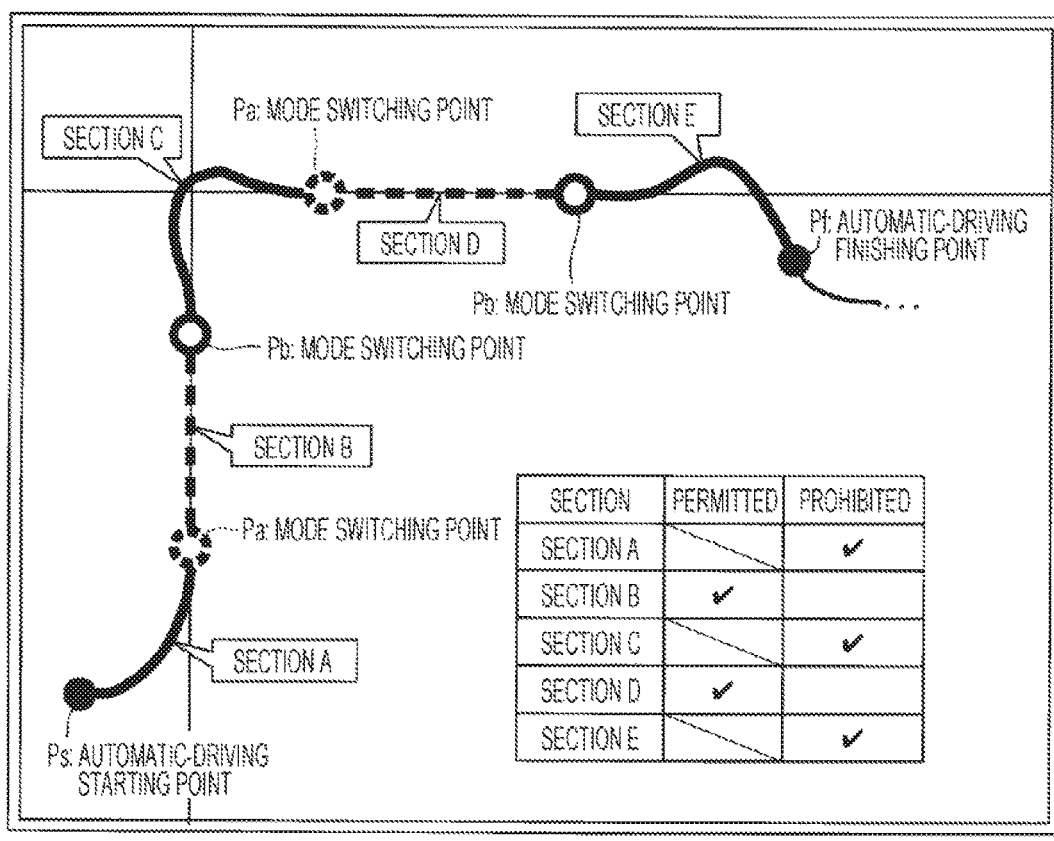
FIG. 15 illustrates an example of a screen displayed by an information input/output device.

FIG. 15 illustrates an example of a screen displayed by the information input/output device 65. In the example illustrated in FIG. 15, the section B and the section D are each a section in which automatic-driving mode is permitted, and a vehicle occupant is caused to select whether each of these sections is to remain as the section in which automatic-driving mode is permitted or is to be changed to a section in which automatic-driving is prohibited by, for example, filling out checkboxes. In the example illustrated in FIG. 15, the section B and the section D remain to be the state set by the changing unit 140.

Then, referring back to FIG. 14, the changing unit 140 waits for an operation to be performed on the information input/output device 65, the operation for selecting whether the section in which automatic-driving mode has been permitted remains as the permitted section or is changed to a prohibited section (step S204). Upon selection of permission or prohibition by the vehicle occupant, the changing unit 140 changes, in accordance with the selected setting, conditions for implementing automatic driving for each event and sets again the permission and prohibition of automatic-driving mode for each event (step S206).

Then, the changing unit 140 determines whether or not each event in an action plan generated by the action-plan generating unit 106 corresponds to a predetermined event (step S208). If there is no event corresponding to the predetermined event, the traveling control unit 130 notifies the vehicle occupant through the information input/output device 65 that automatic-driving mode is to be started (step S210). Then, upon arriving of the subject vehicle M at the automatic-driving starting point Ps, the traveling control unit 130 starts automatic-driving mode (step S212).

On the other hand, if there is an event corresponding to the predetermined event, the changing unit 140 notifies the vehicle occupant through the information input/output device 65 that automatic-driving mode is prohibited for the section in which this event is to be performed (step S214). Then, the changing unit 140 changes the control mode to manual-driving mode for the section in which the event corresponding to the predetermined event is to be performed (step S216).

On the other hand, if the subject vehicle M has not been registered as a towing vehicle, the changing unit 140 determines whether or not the towing-state detecting unit 145 has detected that the subject vehicle M is in a state of towing an object to be towed (step S218). If the towing-state detecting unit 145 has detected that the subject vehicle M is in a state of towing an object to be towed, the changing unit 140 deletes information on the automatic-driving section that has been set by the vehicle occupant and performs step S238, which will be described later, thereby the processes in this flowchart end.

On the other hand, if the towing-state detecting unit 145 has not detected an object to be towed, the changing unit 140 determines whether or not the subject vehicle M has arrived at the automatic-driving starting point Ps (step S220). Until the subject vehicle M arrives at the starting point Ps, the changing unit 140 performs the above-described step S218. Upon arriving of the subject vehicle M at the starting point Ps, the traveling control unit. 130 starts automatic-driving mode (step S222).

Then, during traveling of the subject vehicle M in automatic-driving mode, the changing unit 140 determines whether or not the towing-state detecting unit 145 has detected that the subject vehicle M is in a state of towing an object to be towed (step S224). During traveling of the subject vehicle M in automatic-driving mode, if the towing-state detecting unit 145 has detected that the subject vehicle M is in a state of towing an object to be towed, the changing unit. 140 performs the above-described step S206.

During traveling of the subject vehicle M in automatic-driving mode, if the towing-state detecting unit 145 has not detected that the subject vehicle M is in a state of towing an object to be towed, the changing unit 140 determines whether or not the traveling control unit 130 is implementing driving in manual-driving mode (step S226). If the traveling control unit 130 is implementing driving in automatic-driving mode, the changing unit 140 performs step S236, which will be described later. If the traveling control unit 130 is implementing driving in manual-driving mode, it is determined whether or not automatic driving is implementable in the next section of the section in which the subject vehicle M is currently traveling (step S228).

If automatic driving is not implementable in the next section, the traveling control unit 130 maintains the current manual-driving mode (step S230). On the other hand, if automatic driving is implementable in the next section, the changing unit 140 notifies the vehicle occupant through the information input/output device 65 that it is possible to change the control mode to automatic-driving mode (step S232). Accordingly, for example, if the driver has changed the control mode to automatic-driving mode by operating the switch 80 (step S234: YES), the traveling control unit 130 starts automatic-driving mode from the next section as the above-described step S222. Note that the traveling control unit 130 may start automatic-driving mode when a predetermined period has passed, for example, after the control mode has been changed to automatic-driving mode through an operation on the switch 80 without waiting for the next section.

Then, the changing unit 140 determines whether or not the subject vehicle M has arrived at the automatic-driving finishing point Pf (step S236). If the subject vehicle M has not arrived at the automatic-driving finishing point Pf, the changing unit 140 performs the above-described step S224 again. On the other hand, if the subject vehicle M has arrived at the automatic-driving finishing point Pf, the traveling control unit 130 ends automatic-driving mode (step S238), thereby ending the processes in this flowchart.

In the vehicle control system 1 according to the above-described embodiment, if it has been detected that the subject vehicle M is in a state of towing an object to be towed, details of control performed by the lane-keeping control unit 111, the lane-changing control unit 112, or the like are changed in such a manner that it is less likely to perform automatic control than in the case where it has not been detected that the subject vehicle M is in a state of towing an object to be towed. Accordingly, it is possible for the vehicle control system 1 to appropriately implement automatic driving in accordance with the towing state of the subject vehicle M.

In addition, in the vehicle control system 1 according to the above-described embodiment, one or all of lane changing, merging, and branching, in each of which it is necessary to check situations behind the subject vehicle M, are prohibited. Accordingly, it is possible to appropriately implement automatic driving in accordance with the towing state of the subject vehicle M, thereby increasing the safety of automatic driving.

In addition, in the vehicle control system 1 according to the above-described embodiment, if it has been detected that the subject vehicle M is in a state of towing an object to be towed, the information input/output device 65 is caused to output information indicating that automatic-driving mode is prohibited. Accordingly, it is possible to smoothly switch driving to manual driving implemented by the driver.

In addition, in the vehicle control system 1 according to the above-described embodiment, if it has been detected that the subject vehicle M is in a state of towing an object to be towed, the maximum velocity of the subject vehicle M, the distance to a surrounding vehicle, and the like during automatic-driving mode are changed in such a manner that it is unlikely to implement automatic driving. Accordingly, it is possible to more safely implement automatic driving.

Although the embodiment for implementing the present disclosure has been described above, the present disclosure is not limited to such an embodiment, and various modifications and replacements may be made without departing from the spirit of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle control device comprising:
a detector that detects a towing state of a subject vehicle;
a recognizing unit that recognizes surrounding situations of the subject vehicle;
a controller that performs automatic control in which at least one of acceleration-and-deceleration and steering of the subject vehicle is automatically controlled on the basis of the surrounding situations of the subject vehicle recognized by the recognizing unit; and
a changing unit that changes, if the detector defects that the subject vehicle is in a state of towing an object, details of control performed by the controller to restrict the automatic control compared to a case where the detector does not detect that the subject vehicle is in the state of towing the object.

2. The vehicle control device according to claim 1, wherein, if the detector detects that the subject vehicle is in the state of towing the object, the changing unit prohibits the automatic control performed by the controller by using a surrounding situation behind the subject vehicle with respect to a traveling direction of the subject vehicle among the surrounding situations of the subject vehicle recognized by the recognizing unit.

3. The vehicle control device according to claim 2, wherein, if the detector detects that the subject vehicle is in the state of towing the object, the changing unit prohibits the automatic control performed by the controller including at least one of:
control for making the subject vehicle change lane from a current subject lane in which the subject vehicle is traveling to a lane next to the subject lane,
control for making the subject vehicle change lane to a lane that merges with the subject lane, and
control for making the subject vehicle change lane to a lane that branches from the subject lane.

4. The vehicle control device according to claim 2, further comprising:
an input unit that receives an input operation performed by a vehicle occupant; and
an output unit that outputs information to the vehicle occupant,
wherein the changing unit causes the output unit to output information indicating a section obtained by excluding a section in which the automatic control is prohibited from a traveling section determined on the basis of the input operation received by the input unit, and selects a section in which the controller is caused to perform the automatic control on the basis of an input operation performed by the vehicle occupant on the input unit, and
wherein the controller performs the automatic control in the section selected by the changing unit.

5. The vehicle control device according to claim 4, wherein, if the detector detects that the subject vehicle is in the state of towing the object after the input operation for determining the traveling section of the subject vehicle has been performed on the input unit and before the controller performs the automatic control, the changing unit deletes setting of the traveling section and prohibits the automatic control performed by the controller.

6. The vehicle control device according to claim 4, wherein, if the detector detects that the subject vehicle is in the state of towing the object, the changing unit causes the output unit to output information indicating that the automatic control performed by the controller is prohibited.

7. The vehicle control device according to claim 1, wherein, if the detector detects that the subject vehicle is in the state of towing the object, the changing unit sets a maximum velocity of the subject vehicle to be output in the automatic control performed by the controller to a value lower than a maximum velocity of the subject vehicle to be output in the automatic control performed by the controller when the detector does not detect that the subject vehicle is in the state of towing the object.

8. The vehicle control device according to claim 1, wherein, if the detector detects that the subject vehicle is in the state of towing the object, the changing unit sets a distance to be maintained between the subject vehicle and a surrounding vehicle of the subject vehicle in the automatic control performed by the controller to a value larger than a distance to be maintained between the subject vehicle and the surrounding vehicle of the subject vehicle in the automatic control performed by the controller when the detector does not detect that the subject vehicle is in the state of towing the vehicle.

9. The vehicle control device according to claim 1, wherein, if the detector detects that the subject vehicle is in the state of towing the object, the changing unit changes details of control performed by the control unit in such a manner that, it is less likely to perform the automatic control than in the case where the detecting unit does not detect that the subject vehicle is in the state of towing the object.

10. The vehicle control device according to claim 1, wherein, if the detector detects that the subject vehicle is in the state of towing the object, the changing unit prohibits the automatic control performed by the controller in accordance with a traveling event of the subject vehicle in a planned travel route.

11. The vehicle control device according to claim 1, wherein, if the detector detects that the subject vehicle is in the state of towing the object, the changing unit changes the automatic control performed by the controller to a limited automatic control in accordance with a traveling event of the subject vehicle in a planned travel route.

12. A vehicle control method performed by an in-vehicle computer, comprising:
defecting, by the in-vehicle computer, a towing state of a subject vehicle in which the in-vehicle computer is installed;
recognizing, by the computer, surrounding situations of the subject vehicle;
performing, by the computer, automatic control for automatically controlling at least one of acceleration-and-deceleration and steering of the subject vehicle on the basis of the recognized surrounding situations of the subject vehicle; and
if it is detected that the subject vehicle is in a state of towing an object, changing by the computer details of control in the automatic control to restrict the automatic control compared to a case where it is not detected that the subject vehicle is in the state of towing the object.

13. A non-transitory computer readable medium storing a vehicle control program to cause an in-vehicle computer to:
detect a towing state of a subject vehicle in which the in-vehicle computer is installed;
recognize surrounding situations of the subject vehicle;
perform automatic control for automatically controlling at least one of acceleration-and-deceleration and steering of the subject vehicle on the basis of the recognized surrounding situations of the subject vehicle; and
if it is detected that the subject vehicle is in a state of towing an object, change details of control in the automatic control to restrict the automatic control compared to a case where it is not detected that the subject vehicle is in the state of towing the object.

* * * * *